United States Patent
Kotler et al.

(10) Patent No.: US 7,523,390 B2
(45) Date of Patent: Apr. 21, 2009

(54) SPREADSHEET FIELDS IN TEXT

(75) Inventors: Matthew J. Kotler, Kenmore, WA (US); Alexander G. Gounares, Kirkland, WA (US); Oliver G. Fisher, Ottawa (CA); Matthew D. Morgan, Seattle, WA (US); Christopher Matthew Franklin, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 33 days.

(21) Appl. No.: 10/961,313

(22) Filed: Oct. 8, 2004

(65) Prior Publication Data
US 2005/0044496 A1 Feb. 24, 2005

Related U.S. Application Data

(62) Division of application No. 09/599,808, filed on Jun. 21, 2000, now Pat. No. 7,117,435.

(51) Int. Cl.
*G06F 17/00* (2006.01)
*G06F 15/00* (2006.01)

(52) U.S. Cl. .................. 715/212; 715/234; 715/217

(58) Field of Classification Search ................ 715/503, 715/504, 509, 510, 515
See application file for complete search history.

(56) References Cited

U.S. PATENT DOCUMENTS

| 4,514,800 A | 4/1985 | Gruner et al. |
|---|---|---|
| 4,641,274 A | 2/1987 | Swank |
| 4,674,040 A | 6/1987 | Barker et al. |
| 4,739,477 A | 4/1988 | Barker et al. |
| 4,815,029 A | 3/1989 | Barker et al. |
| 4,847,749 A | 7/1989 | Collins et al. |
| 4,910,663 A | 3/1990 | Bailey |
| 4,933,880 A | 6/1990 | Borgendale et al. |
| 4,962,475 A | 10/1990 | Hernandez et al. |
| 5,072,412 A | 12/1991 | Henderson, Jr. et al. |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |

(Continued)

FOREIGN PATENT DOCUMENTS

EP 0841615 A2 11/1999

(Continued)

OTHER PUBLICATIONS

Microsoft Visual Basic 5.0 Programmer's Guide, 1997, pp. 578-579, Redmond, Washington 98052-6399.*

(Continued)

*Primary Examiner*—Doug Hutton
*Assistant Examiner*—Nathan Hillery

(57) ABSTRACT

A system architecture integrates spreadsheet functionality into text. The architecture allows insertion of discrete individual fields, referred to as "free floating fields", inline with normal textual sentences. In an HTML document, for example, the free floating fields are elements constructed along with text elements and rendered together as an integrated document. Once rendered, the free floating fields present contents that resemble normal text consistent with the surrounding text. The free floating fields offer spreadsheet functionality, including the ability to handle complex formulas, reference values in a separate free floating field or table, and automatically recalculate the formulas when a source value changes.

20 Claims, 10 Drawing Sheets

U.S. PATENT DOCUMENTS

| | | |
|---|---|---|
| 5,218,672 A | 6/1993 | Morgan et al. |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,381,547 A | 1/1995 | Flug et al. |
| 5,390,325 A | 2/1995 | Miller |
| 5,408,665 A | 4/1995 | Fitzgerald |
| 5,410,688 A | 4/1995 | Williams et al. |
| 5,434,975 A | 7/1995 | Allen |
| 5,436,637 A | 7/1995 | Gayraud et al. |
| 5,440,744 A | 8/1995 | Jacobson et al. |
| 5,446,842 A | 8/1995 | Schaeffer et al. |
| 5,459,865 A | 10/1995 | Heninger et al. |
| 5,481,722 A | 1/1996 | Skinner |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,602,996 A | 2/1997 | Powers, III et al. |
| 5,608,720 A | 3/1997 | Biegel et al. |
| 5,627,979 A | 5/1997 | Chang et al. |
| 5,630,126 A * | 5/1997 | Redpath ................ 707/103 R |
| 5,634,121 A | 5/1997 | Tracz et al. |
| 5,640,544 A | 6/1997 | Onodera et al. |
| 5,659,729 A | 8/1997 | Nielsen |
| 5,664,178 A | 9/1997 | Sinofsky |
| 5,669,005 A | 9/1997 | Curbow et al. |
| 5,682,536 A | 10/1997 | Atkinson et al. |
| 5,689,703 A | 11/1997 | Atkinson et al. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,784,555 A | 7/1998 | Stone |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,864,819 A | 1/1999 | De Armas et al. |
| 5,907,704 A | 5/1999 | Gudmundson et al. |
| 5,911,776 A | 6/1999 | Guck |
| 5,915,112 A | 6/1999 | Boutcher |
| 5,922,072 A | 7/1999 | Hutchinson et al. |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,963,964 A | 10/1999 | Nielsen |
| 5,982,370 A | 11/1999 | Kamper |
| 5,987,480 A | 11/1999 | Donohue et al. |
| 5,991,710 A | 11/1999 | Papineni et al. |
| 5,995,103 A | 11/1999 | Ashe |
| 5,999,740 A | 12/1999 | Rowley |
| 6,014,135 A | 1/2000 | Fernandes |
| 6,016,520 A | 1/2000 | Facq et al. |
| 6,026,379 A | 2/2000 | Haller et al. |
| 6,026,416 A | 2/2000 | Kanerva et al. |
| 6,031,989 A | 2/2000 | Cordell |
| 6,044,205 A | 3/2000 | Reed et al. |
| 6,052,710 A | 4/2000 | Saliba et al. |
| 6,054,987 A | 4/2000 | Richardson |
| 6,072,870 A | 6/2000 | Nguyen et al. |
| 6,078,326 A | 6/2000 | Kilmer et al. |
| 6,078,327 A | 6/2000 | Liman et al. |
| 6,081,610 A | 6/2000 | Dwork et al. |
| 6,084,585 A | 7/2000 | Kraft et al. |
| 6,088,708 A | 7/2000 | Burch et al. |
| 6,091,417 A | 7/2000 | Lefkowitz |
| 6,094,657 A | 7/2000 | Hailpern et al. |
| 6,098,081 A | 8/2000 | Heidorn et al. |
| 6,108,637 A | 8/2000 | Blumenau |
| 6,108,783 A | 8/2000 | Krawczyk et al. |
| 6,122,647 A | 9/2000 | Horowitz et al. |
| 6,144,969 A | 11/2000 | Inokuchi et al. |
| 6,151,624 A | 11/2000 | Teare et al. |
| 6,163,772 A | 12/2000 | Kramer et al. |
| 6,167,521 A | 12/2000 | Smith et al. |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,698 B1 | 4/2001 | Iannucci et al. |
| 6,225,996 B1 | 5/2001 | Gibb et al. |
| 6,235,027 B1 | 5/2001 | Herzon |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,275,227 B1 | 8/2001 | DeStefano |
| 6,275,599 B1 | 8/2001 | Adler et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,297,819 B1 | 10/2001 | Furst |
| 6,308,179 B1 | 10/2001 | Petersen et al. |
| 6,311,271 B1 | 10/2001 | Gennaro et al. |
| 6,321,334 B1 | 11/2001 | Jerger et al. |
| 6,327,628 B1 | 12/2001 | Anuff et al. |
| 6,343,302 B1 | 1/2002 | Graham |
| 6,345,256 B1 | 2/2002 | Milsted et al. |
| 6,345,361 B1 | 2/2002 | Jerger et al. |
| 6,347,323 B1 | 2/2002 | Garber et al. |
| 6,349,408 B1 | 2/2002 | Smith |
| 6,353,926 B1 | 3/2002 | Parthesarathy et al. |

| | | |
|---|---|---|
| 6,356,906 B1 | 3/2002 | Lippert et al. |
| 6,357,038 B1 | 3/2002 | Scouten |
| 6,366,912 B1 | 4/2002 | Wallent et al. |
| 6,369,840 B1 | 4/2002 | Barnett et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,389,434 B1 | 5/2002 | Rivette |
| 6,393,456 B1 | 5/2002 | Ambler et al. |
| 6,396,488 B1 | 5/2002 | Simmons et al. |
| 6,408,311 B1 | 6/2002 | Baisley et al. |
| 6,421,070 B1 | 7/2002 | Ramos et al. |
| 6,421,656 B1 | 7/2002 | Cheng et al. |
| 6,425,125 B1 | 7/2002 | Fries et al. |
| 6,434,563 B1 | 8/2002 | Pasquali et al. |
| 6,434,564 B2 | 8/2002 | Ebert |
| 6,442,755 B1 | 8/2002 | Lemmons et al. |
| 6,446,110 B1 | 9/2002 | Lection et al. |
| 6,460,058 B2 | 10/2002 | Koppolu |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky |
| 6,480,860 B1 | 11/2002 | Monday |
| 6,487,566 B1 | 11/2002 | Sundaresan |
| 6,493,702 B1 | 12/2002 | Adar et al. |
| 6,502,101 B1 | 12/2002 | Verprauskus et al. |
| 6,502,103 B1 | 12/2002 | Frey et al. |
| 6,505,230 B1 | 1/2003 | Mohan et al. |
| 6,505,300 B2 | 1/2003 | Chan et al. |
| 6,507,856 B1 | 1/2003 | Chen et al. |
| 6,516,322 B1 | 2/2003 | Meredith |
| 6,519,617 B1 | 2/2003 | Wanderski et al. |
| RE38,070 E | 4/2003 | Spies et al. |
| 6,546,546 B1 | 4/2003 | Van Doorn |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,548 B1 | 6/2003 | Bourne et al. |
| 6,585,778 B1 | 7/2003 | Hind et al. |
| 6,598,219 B1 | 7/2003 | Lau |
| 6,604,099 B1 | 8/2003 | Chung et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,613,098 B1 | 9/2003 | Sorge et al. |
| 6,615,276 B1 | 9/2003 | Mastrianni et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 * | 10/2003 | Jamshidi et al. ............ 715/205 |
| 6,631,519 B1 | 10/2003 | Nicholson et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,684 B1 | 11/2003 | Malkin et al. |
| 6,654,737 B1 | 11/2003 | Nunez |
| 6,658,417 B1 | 12/2003 | Stakutis et al. |
| 6,668,369 B1 | 12/2003 | Krebs et al. |
| 6,678,717 B1 | 1/2004 | Schneider |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,711,679 B1 | 3/2004 | Guski et al. |
| 6,748,385 B1 | 6/2004 | Rodkin |
| 6,751,777 B2 | 6/2004 | Bates |
| 6,760,723 B2 | 7/2004 | Oshinsky et al. |
| 6,772,139 B1 | 8/2004 | Smith |
| 6,774,926 B1 | 8/2004 | Ellis |
| 6,845,380 B2 | 1/2005 | Su et al. |
| 6,845,499 B2 | 1/2005 | Srivastava et al. |
| 6,848,078 B1 | 1/2005 | Birsan et al. |
| 6,874,130 B1 | 3/2005 | Baweja et al. |
| 6,901,403 B1 | 5/2005 | Bata et al. |
| 6,931,532 B1 | 8/2005 | Davis et al. |
| 6,963,875 B2 | 11/2005 | Moore et al. |
| 6,968,505 B2 | 11/2005 | Stoll et al. |
| 2001/0024195 A1 | 9/2001 | Hayakawa |
| 2001/0037345 A1 | 11/2001 | Kiernan et al. |
| 2001/0056429 A1 | 12/2001 | Moore et al. |
| 2001/0056460 A1 | 12/2001 | Sahota et al. |
| 2002/0026441 A1 | 2/2002 | Kutay et al. |
| 2002/0026461 A1 | 2/2002 | Kutay et al. |
| 2002/0040469 A1 | 4/2002 | Pramberger |
| 2002/0057297 A1 | 5/2002 | Grimes et al. |
| 2002/0100027 A1 | 7/2002 | Binding et al. |
| 2002/0112224 A1 | 8/2002 | Cox |
| 2002/0133484 A1 | 9/2002 | Chau et al. |
| 2002/0156772 A1 | 10/2002 | Chau et al. |
| 2002/0156929 A1 | 10/2002 | Hekmatpour |
| 2002/0169789 A1 | 11/2002 | Kutay et al. |
| 2002/0174147 A1 | 11/2002 | Wang et al. |
| 2002/0184219 A1 | 12/2002 | Preisig et al. |
| 2002/0196288 A1 | 12/2002 | Emrani |
| 2002/0198891 A1 | 12/2002 | Li et al. |
| 2003/0014397 A1 | 1/2003 | Chau et al. |
| 2003/0037303 A1 | 2/2003 | Bodlaender et al. |
| 2003/0043986 A1 | 3/2003 | Creamer et al. |
| 2003/0051243 A1 | 3/2003 | Lemmons et al. |
| 2003/0056198 A1 | 3/2003 | Al-Azzawe et al. |
| 2003/0061386 A1 | 3/2003 | Brown et al. |
| 2003/0120659 A1 | 6/2003 | Sridhar |
| 2003/0120671 A1 | 6/2003 | Kim et al. |
| 2003/0140132 A1 | 7/2003 | Champagne et al. |
| 2003/0158897 A1 | 8/2003 | Ben-Natan et al. |
| 2003/0182268 A1 | 9/2003 | Lal |
| 2003/0187930 A1 | 10/2003 | Ghaffar et al. |
| 2003/0189593 A1 | 10/2003 | Yarvin |
| 2003/0204511 A1 | 10/2003 | Brundage et al. |
| 2003/0204814 A1 | 10/2003 | Elo et al. |
| 2003/0205615 A1 | 11/2003 | Marappan |
| 2003/0225768 A1 | 12/2003 | Chaudhuri et al. |
| 2003/0225829 A1 | 12/2003 | Pena et al. |
| 2003/0237046 A1 | 12/2003 | Parker et al. |
| 2003/0237047 A1 | 12/2003 | Borson |
| 2004/0002939 A1 | 1/2004 | Arora et al. |
| 2004/0117769 A1 | 6/2004 | Lauzon et al. |
| 2004/0205473 A1 | 10/2004 | Fisher et al. |
| 2004/0205571 A1 | 10/2004 | Adler et al. |
| 2005/0102370 A1 | 5/2005 | Lin et al. |
| 2005/0198086 A1 | 9/2005 | Moore et al. |

FOREIGN PATENT DOCUMENTS

| | | |
|---|---|---|
| EP | 0961197 | 12/1999 |
| EP | 1076290 A2 | 2/2001 |
| JP | 63085960 | 4/1988 |
| JP | 401173140 A | 7/1989 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 3191429 | 1/2000 |
| JP | 2000132436 | 5/2000 |
| JP | 2002183652 | 6/2002 |

| | | |
|---|---|---|
| JP | 2003173288 | 6/2003 |
| WO | WO99/24945 | 5/1999 |
| WO | WO99/56207 | 11/1999 |
| WO | WO01/44934 A1 | 6/2001 |

OTHER PUBLICATIONS

Excel Developer Tip, "Determining the Data Type of a Cell", May 13, 1998, p. 1 (available at http://jwalk.com/ss/excel/tips/tip62.htm).*
Microsoft Word 2000 Screenshots, 1999, pp. 1-5.*
"Using Corel WordPerfect 9", Acklen and Gilgen, 1998, pp. 251-284, 424-434, and 583-586.
"Using Microsoft Excel '97", Halberg et al., 1997, pp. 5-8, 21-22, 18-20, 99-101, 112-113, 125-126, 145-147, 196-199, 221-226, and 650-652.
Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.
Leblond et al, "PC Magazine Guide to Quattro Pro for Windows", pp. 9-11, 42-61, Ziff-Davis Press, Copyright 1993 by the LeBlond Group, 25 pp.
Cybook, Inc.; "Copying the Search Form to Services-based Web Sites" INternet Article, (online) Jul. 26, 2004. *the whole document*.
Macromedia, Inc.; "Dreamweaver Technote, Changes in copying and pasting in Dreamweaver 4" Internet Article (online). *the whole document*.
Rado, Dave: "How to create a template that makes it easy for users to "fill in the blanks", without doing any programming" Microsoft Word MVP FAQ Site, (online) Apr. 30, 2004. *the whole document*.
"A tour of Xmetal" O'Reilly XML.COM 'Online Jul. 14, 1999 XP002230081 retrieved from the Internet: [URL:http://www.xml.com/pub/a/SeyboldReport/ip0311025.html] retrieved on Feb. 5, 2003.
Atova, "User Reference manual Version 4.4, XML Spy suite 4.4," Atova Ges.m.b.H and Altova, Inc., May 24, 2002, pages cover, copyright p. 1-565.
Altova et al. XML Spy, XML integrated Development Environments, Altova Inc., 2002, pp. 1-18.
"Architecture for a Dynamic Information Area Control" IBM Technical Disclosure Bulletin IBM Corp. New York US vol. 37 No. 10 Jan. 10, 1994. pp. 245-246.
"Netscape Communicator's Collapsible Toolbars" CHI'98 Human Factors in Computing Systems Conference Proceedings Los Angeles CA Apr. 18-23, 1998 pp. 81-86.
Barker et al., "Creating In-Line Objects Within An Integrated Editing Environment," IBM Technical Disclosure Bulletin, vol. 27, No. 5, Oct. 1984, p. 2962.
"Flexible Information Presentation with XML" 1998 The Institution of Electrical Engineers 6 pages.
Ben-Natan, U.S. Appl. No. 60/203,081, filed May 9, 2000, entitled "Internet platform for creating and supporting communities".
Berg A., "Naming and Binding: Monikers" Inside OLE, 1995, Chapter 9, pp. 431-490.
"Arbortext Adept 8 Editor Review" O'Reilly XML.COM 'Online! Sep. 22, 1999 XP002230080 retrieved from the Internet [URL:http://www.xml.com/pub/a/1999/09/adept/AdeptRvw.htm] retrieved on Feb. 5, 2003.
"XKvalidator: A Constraint Validator for XML" CIKM '-2 Nov. 4-9, 2002 Copyright 2002 ACM 1-58113-492-4/02/0011 pp. 446-452.
"Designing Valid XML Views" ER 2002 LNCS 2503 2002 Springer-Verlag Berlin Heidelberg 2002 pp. 463-477.
Efficient Management of Multiversion Documents by Object Referencing Proceedings of the 27th VLDB Conference 2001 pp. 291-300.
"Efficient schemes for managing mulitversion XML documents" VLDB Journal (2002) pp. 332-352.
"Storing and Querying Multiversion XML Documents using Durable Node Numbers" IEEE 2002 pp. 232-241.
"XML Document Versioning" SIGMOD Record vol. 30 No. 3 Spet 2001 pp. 46-53.
"Generic Validation of Structural Content with Parametric Modules" ICFP '01 Sep. 3-5, 2001 Copyright 2001 ACM 1-58113-415-0/01/0009 pp. 98-109.

"Managing Complex Documents Over the WWW: A Case Study for XML" IEEE Transactions on Knowledge and Data Engineering Vo.1. 11 No. 4 Jul./Aug. 1999. pp. 629-938.
Clapp D., "The NeXT Application Kit Part I: Non-Responsive Classes," The NeXT Bible 1990, Chapter 16, pp. 275-293.
Clark James—W3C Editor; "XSL Transformation (XSLT) Verison 1.0" Nov. 16, 1999 W3C (MIT Inria Kejo) pp. 1-156.
W3C Editor James Clark and Ste; "XML Path Language (XPath) Version 1.0" Nov. 16, 1999 W3C (MIT Inria Kejo) pp. 1-49.
"From small beginnings" Knowledge Management Nov. 2001 pp. 28-30.
"XML Editors: Allegations of Functionality in search of reality" Internet 'Online! 1999 XP002230082 retrieved from the Internet [URL:http://www.lvritype.com/xml/].
"Photo Shop 5/5.5 WOW! Book" 2000 Peachpit Press pp. 8-17.
Description of Whitehill Composer software product producted by Whitehill Technologies Inc. available at [http://www.xml.com/pub/p/221] accessed on Apr. 8, 2004, two pages.
DiLascia et al., "Sweeper" Microsoft Interactive Developer, vol. 1, No. 1, 1996, 27 pages.
"XML Spy Tops as XML Editor" http://www.eweek.com/article2/0395972404100.asp Nov. 25, 2002 4 pages.
"Agent-based Software Configuration and Deployment" Thesis of the University of Colorado Online Dec. 31, 1999 retrieved from the Internet on Nov. 7, 2003: [http://www.cs.colorado.edu/users/rickhall/documents/ThesisFinal.pdf] 169 pages.
Han et al., WebSplitter: A Unified XML Framework for Multi-Device Collaborative Web Browsing, 2000, ACM Conference on Cimputer Supported Cooperative Work, 10 pages.
"Mapping and Displaying Structural Transformations between XML and PDF" DocEng '02 Nov. 8-9, 2002 Copyright 2002 ACM 1-58113-597-7/02/0011 pp. 95-102.
"Tsbiff—tildeslash biff—version 1.2.1" Internet Document [Online] Jun. 1999 URL: http://web.archive.org/web/19990912001527/http://www.tildeslash.com/tsbiff/.
Herzner et al., "CDAM- Compound Document Access and Management. An Object-Oriented Approach" Multimedia Systems Interaction and Applications, 1992, Chapter 3, pp. 17-36.
"Micro-Firewalls for Dynamic Network Security with Distributed Intrusion Detection"; IEEE INternational Symposium on Network Computing and Applications; 2001; pp. 68-79.
IBM: Stack Algorithm for Extraction Subtree from Serialized Tree, Mar. 1, 1994, TDB-ACC-NONN94033, 3 pages.
Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.
"Specifying Runtime Environments and Functionalities of Downloadable Components Under the Sandbox Mode"; International Symposium on Principles of Software Evolution; 2000; pp. 138-142.
"An Efficiently Updatable Index Scheme for Structured Documents" 1998 IEEE pp. 991-996.
McCright J.S.; "New Tool Kit to Link Groove with Microsoft Sharepoint" eWeek Enterprise News and Reviews Ziff Davis Media Inc. Jul. 29, 2002.
Microsoft Word 2000 (see Screen Shot "About Microsoft Word") Published 1983-1999 and Microsoft Excel 2000 (see Screen Shot "About Microsoft Excel") Published 1988-1999, Three pages.
Moore, U.S. Appl. No. 60/191,662, filed Mar. 23, 2000, entitled "Collection-based presistent digital archives".
Musgrave S; "Networking technology—impact and opportunities" Survey and Statistical Computing 1996. Proceedings of the Second ASC International Conference. Sep. 1996. pp. 369-378. London UK.
"Validation with MSXML and XML Schema" Windows Developer Magazine Jan. 2002 pp. 35-38.
"SmartUpdate Developer's Guide" Online Mar. 11, 1999 retrieved from the Internet on Dec. 8, 2000; [http://developer.netscape.com:80/docs/manuals/communicator/jarman/index.htm] 83 pages.
"Netscape Communicator 4.61 for OS/2 Warp" Software 1999 The whole software release and "Netscape—Version 4.6 [en]-010615" Netscape Screenhot Oct. 2, 2002.

"A secure conditional access system using digital signature and encryption" 2003 Digest of Technical Papers. International Conference on Consumer Electronics Jun. 2003 pp. 220-221.

Object Management Group, XML Metadata Interchange (XMI) Specification Version 1.2 Jan. 2002.

"Delphi 5 Developer's Guide" Sams Publishing 1999 Chapter 31 Section: Data Streaming 6 pages.

Peterson B., "Unix Variants," Unix Review, vol. 10, No. 4, Apr. 1992, pp. 29-31.

Pike et al., "Plan 9 from Bell Labs" UKUUG, Summer 1990, 10 pages.

Pike et al., "The Use of Name Spaces in Plan 9," Operating Systems Review vol. 27, No. 2, Apr. 1993, pp. 72-76.

Prevelakis et al., "Sandboxing Applications"; Proceedings of the Freenix Track; 2001; pp. 119-126.

Rapaport L; "Get more from SharePoint" Transform Magazine vol. 11 No. 3. Mar. 2002 pp. 1315.

"Validating MPEG-21 Encapsulated Functional Metadata" IEEE 2002 pp. 209-212.

Schmid et al., "Protecting Data from Malicious Software"; 18th Annual Computer Security Applications Conference; 2002; pp. 199-208.

Staneck W., "Internal and External Media" Electronic Publishing Unleashed, 1995, Chapter 22, pp. 510-542.

"Store and Organize Related Project Files in a Binder," Getting Results with Microsoft Office, 1990, pp. 109-112.

Sun Q. et al., "A robust and secure media signature scheme for JPEG Images" Proceedings of 2002 IEEE Workshop on Multimedia Signal Processing, Dec. 2002, pp. 296-299.

"XFIG Version 3.2 Patchlevel 2 (Jul. 2, 1998) Users Manual (Edition 1.0)" Internet Document [Online] Jul. 2, 1998 XP002229137 Retrieved from the Internet: [URL:http://www.ice.mtu.edu/online_docs/xfig332/] [retrieved on Jan. 28, 2003].

"An Efficient and Flexible Access Control Framework for Java Programs in Mobile Terminals"; 22nd International Conference on Distributed Computing Systems Workshops; 2002; pp. 777-782.

Trupin J., "The Visual Programmer," Microsoft Systems Journal, Apr. 1996, pp. 103-105.

"XML: Not a Silver Bullet But a Great Pipe Wrench" Standardview vol. 6. No. 3 Sep. 1998 pp. 125-132.

"The Open Software Description Format" Online Aug. 13, 1997 retrieved from the Internet on Nov. 7, 2003: [http://www.w3.org/TR/NOTE-OSD] 11 pages.

"Bridging XML-Schema and relational databases. A System for generating and manipulating relational databases using valid XML documents." DocEng '01 Nov. 9-10, 2001 Coppyright 2001 ACM 1-58113-432-0/01/0011 pp. 105-114.

"The Component Object Model A Technical Overview" Oct. 1994 Microsoft Corp. pp. 1-14.

"Managing and Querying Multi-Version XML Data with Update Logging" DocEng '02 Nov. 8-9, 2002 Copyright 2002 ACM 1-58113-594-7/02/0011 pp. 74-81.

Zdonik S., "Object Management System Concepts," ACM, 1984, pp. 13-19.

Microsoft Visual Basic 5.0 Programmer's Guide 1997; pp. 578-579;Redmond WA 98052-6399.

Ron Mansfield, Excel 97 for Busy People Published by Osborne/Mcgraw-Hill 1997 pp. 48-50.

* cited by examiner

John's Construction
1234 N. Road
Anywhere, WA 99999

Dear Mr. Jones,

Here are my preliminary estimates for the work items. The total cost of the project is $12,060. If you want to wait on the kitchen repair, the total cost would be reduced to $6,560.

| Home Section | Work Items | Cost |
|---|---|---|
| Roof | 1. Rip off shingles<br>2. Resurface and apply stucco | $2,300 |
| Kitchen | 1. Repaint Cabinets<br>2. Rework plumbing for sink<br>3. Add ceramic tiling to floor | $5,500 |
| Family Room | 1. Fix blinds<br>2. Reupholster couch<br>3. Install hardwood floors | $3,500 |
| Porch | 1. Repair structural damage<br>2. Sand and repaint with ivory Asian paint | $760 |

Thanks,

John

*Fig. 2*

John's Construction
1234 N. Road
Anywhere, WA 99999

Dear Mr. Jones,

Here are my preliminary estimates for the work items. Note that I substituted different paint for DuPont since it is out of stock.

|   | A | B | C |
|---|---|---|---|
| 1 | Home Section | Work Items | Cost |
| 2 | Roof | 1. Rip off shingles<br>2. Resurface and apply stucco | $2,300 |
| 3 | Kitchen | Repaint Cabinets — $300<br>Plumb Sink — $1,500<br>Tile Floor — $3,700 | =SUM(Table2!B1:Table2!B3) |
| 4 | Family Room | 1. Fix blinds<br>2. Reupholster couch<br>3. Install hardwood floors | $3,500 |
| 5 | Porch | 1. Repair structural damage<br>2. Sand and repaint with ivory Asian paint | $760 |
| 6 | Total |  | $12,060 |

Thanks,

John

*Fig. 5*

John's Construction
1234 N. Road
Anywhere, WA 99999

Dear Mr. Jones,

Here are my preliminary estimates for the work items. The total cost is approximately =Table1!B6+Table2!B8  ← 610
608

602 → Table 1

| Outdoor Work Items | Cost |
|---|---|
| 1. Rip off roof shingles | $300 |
| 2. Resurface and stucco | $2,000 |
| 3. Repair porch damage | $360 |
| 4. Paint porch | $400 |
| Total | $3,060 |

The itemized cost for the outdoor work items are summarized in Table 1. Note that I substituted different paint for DuPont since it is out of stock.

604 → Table 2

The itemized cost for the indoor work items are summarized in Table 2.

| Indoor Work Items | Cost |
|---|---|
| 1. Repaint Cabinets | $300 |
| 2. Plumb sink | $1,500 |
| 3. Tile floor | $3,700 |
| 4. Fix blinds | $200 |
| 5. Reupholster couch | $400 |
| 6. Install hardwood floors | $2,900 |
| Total | $9,000 |

As you requested, the costs of pursuing only the roof and kitchen at this time are summarized in Table 3.

606 →

| Big Items Only | Cost |
|---|---|
| Roof | $2,300 |
| Kitchen | $5,500 |
| Total | $7,800 |

=SUM(Table1!B2:Table1!B3)
=SUM(Table2!B2:Table2!B4)

Table 3

Thanks, John

*Fig. 6*

SPREADSHEET FIELDS IN TEXT

RELATED APPLICATIONS

This patent application claims priority to U.S. patent application Ser. No. 09/599,808, titled "Spreadsheet Fields In Text", filed on Jun. 21, 2000, commonly assigned herewith, and hereby incorporated by reference.

TECHNICAL FIELD

This invention relates to computer programs, and particularly, to word processing and spreadsheet programs. More particularly, this invention pertains to an architecture and user interface for integrating individual spreadsheet-like cells into word processing text.

BACKGROUND

Word processing and spreadsheet programs are two well-known and widely used software applications. Word processing programs permit users to draft letters, write books, and create other word-centric documents on a computer. Word processing programs are typically designed with the author in mind by offering tools and user interfaces that make writing easier, such as edit functions (e.g., cut, copy, paste, find, replace, etc.), spell and grammar checking, document formatting, and the like. Examples of word processing programs include "Word" from Microsoft Corporation and "WordPerfect" from Corel Corporation.

Spreadsheet programs enable users to create financial records, accounting spreadsheets, budgets, and other number-centric documents on a computer. Spreadsheet programs are developed with the accountant in mind, focusing on tools and user interfaces that simplify data entry and data manipulation. Spreadsheets typically offer such functionality as in-cell formulas, automatic recalculation as data changes, multi-sheet referencing, cell formatting according to data type (e.g., dates, currency, percentages, etc.), and the like. One example of a spreadsheet program is the "Excel" application from Microsoft Corporation.

In the beginning, spreadsheets and word processing texts were entirely separate from one another. There was essentially no integration. Computer users who wanted to create primarily word-based documents would select a word processing program, while users who wished to produce number-oriented documents turned to spreadsheet programs. Over time, however, word processing users expressed interest in incorporating numbers and a spreadsheet "look" into an otherwise word-dominated document.

To accommodate such crossover situations, word processing programs evolved to offer tables, a visual structure that could be used to hold and organize numbers and other types of data. Tables arrange data in columns and rows, thereby emulating the spreadsheet "look". Word processing users can insert a table, modify its layout, and change cell formats to achieve a specific visual appearance to their data. Some tables even support rudimentary functions, such as adding a set of contiguous cells.

While visually similar to spreadsheets, word processing tables do not support full spreadsheet functionality. For instance, a user is not able to insert functions into a table that automatically update anytime data is modified in the cells.

More recently, object-oriented programming and OLE technologies have been used to provide a richer integration experience. With OLE, word processing users who want greater functionality can embed spreadsheet objects into their word processing documents, instead of tables. Essentially, this is akin to embedding an "Excel" spreadsheet (or other spreadsheet program) into a document running on the "Word" program (or other word processing program). The embedded object carries sufficient functionality to allow the user to enter formulas, format cells, recalculate functions, and do all of the things he/she would normally be able to do on a spreadsheet program.

Though the embedded spreadsheet visually resembles a table and provides the desired spreadsheet functionality, it logistically remains a separate program that must be invoked by the user. OLE requires that both types of application programs—a word processor and a spreadsheet—be installed on the computer. When the user wants to update the embedded spreadsheet, the user invokes the spreadsheet object by moving a mouse pointer to anywhere on the embedded object and double clicking the left mouse button (or via some other actuation mechanism). In response, an instance of the spreadsheet program is executed and the spreadsheet changes appearance from a "table look" to a reduced size spreadsheet program with numbered rows and lettered columns and program specific menus. In this state, the user can change functions, modify data, reformat the spreadsheet, and perform other spreadsheet tasks. When the user is finished, the user returns focus to the word processing document by moving the mouse pointer outside the spreadsheet object and single clicking the left mouse button.

While the OLE approach offers the full spreadsheet functionality within a word processing document, the process is somewhat sophisticated and typically performed by experienced users who are familiar with both spreadsheets and word processing programs. For novice or less experienced users, it may be confusing to see a table and not appreciate the difference between a word processing table and a full-functioning embedded spreadsheet object. From the user standpoint, different operations are used depending upon whether the visible structure is a table or a spreadsheet. Furthermore, common services such as text formatting, spell checking, and the like do not "tunnel" into the embedded OLE objects and thus, the user is forced to run such services for both the document and the embedded spreadsheet.

Thus, even though the final appearance may be visually similar, word processing tables and spreadsheets provide two completely separate mechanisms for displaying information.

A separate, but somewhat related problem, is that spreadsheet functionality has been traditionally limited to a grid. There has been no integration of spreadsheet capabilities into word processing text. When writing a document containing both text and a spreadsheet, all data and formulas are typically contained within the spreadsheet of the document. The text then references the values and formula results in the spreadsheet through sentences like, "The total cost of the project is identified in Table 1".

If the user actually wants to place a value or formula result in the text, the user manually enters the values directly into the text. For example, the user might write, "The total cost of the project is $2,300, as identified in Table 1." Unfortunately, the value (e.g., $2,300) is static text. If the user subsequently changes a value in the spreadsheet, thereby altering the total cost, the sentence remains unchanged. The user must remember the sentence and update it manually.

Some word processing programs (e.g., Microsoft Word) allow insertion of "fields" into text. Using fields, a user may enter dates, simple equations, and the like. However, these fields are independent structures that do not recalculate automatically as one would expect for rudimentary spreadsheet functionality. Moreover, these fields tend to be difficult to edit.

Accordingly, there is a need to better integrate spreadsheet functionality into text.

With the rapidly growing popularity of the Internet, many documents delivered to and rendered on computers are written in markup languages, such as HTML (hypertext markup language). Markup languages can allow authors to easily construct a desired visual layout of the document. Some HTML documents provide tables that look and function as if they were integrated with the surrounding text. For instance, financial Websites commonly offer informative discussions on retirement planning, college savings, or buying a house and include with those discussions one or more tables that invite the user to fill in their personal financial information and goals. When the user finishes entering the data fields, the document appears to make on-the-fly calculations and present the results together with the discussions.

Despite the appearance of in-document calculations, the HTML document is nothing more than an electronic form that receives data entered by the user. When the user completes entry, the HTML document is submitted to a Web server that extracts the user data and makes the appropriate financial calculations. The server places the results in another HTML document and serves the document back to the user's computer. The submit and reply occur very quickly, so the user may be unaware that the HTML document holding the results is different than the HTML document into which he/she initially entered data. In any event, the traditional separation between spreadsheets and text/tables has persisted into the Web-based era.

SUMMARY

A system architecture integrates spreadsheet functionality into text and tables. The architecture allows insertion of discrete individual fields, referred to as "free floating fields", inline with normal textual sentences. In an HTML document, for example, the free floating fields are HTML elements constructed along with text elements and rendered together as an integrated document. Once rendered, the free floating fields present contents that resemble normal text.

The free floating fields offer spreadsheet functionality, including the ability to handle complex formulas, reference values in a separate free floating field or table, and automatically recalculate the formulas when a value changes. The values and formula results can also be formatted (e.g., numbers, date, times, currency, etc.), like a spreadsheet, while remaining part of the normal text. The results of formulas and data values can also be formatted like normal text, using familiar text formatting tools.

Underlying the user interface, one implementation of the architecture separates data handling functions from presentation functions. The architecture includes a user interface manager to manage how the free floating fields appear in a document (e.g., selection, cut, copy, paste, etc.) and to facilitate user entry of formulas and values into the free floating fields. The architecture also has a spreadsheet functionality manager to manage the spreadsheet functions for the free floating fields, such as recalculation, formula handling, referencing, and the like.

The bifurcated architecture supports cross-referencing in which one free floating field references text or data in another free floating field, even though the fields are separate from one another. As part of the cross-referencing, the architecture allows a user to reference other fields using a reference edit operation (e.g., move pointer to the field and click to capture content in the field). The architecture further accommodates automatic universal recalculation throughout all fields in the document. Thus, when a user modifies the contents of one field, the architecture automatically recalculates any formulas in any free floating fields affected by the modification.

The architecture also permits a user to reference textual content via free floating fields. When entering a formula in a first free floating field, the user can select a range of normal text. A second free floating field is automatically created around the range of text and a reference to that second free floating field is automatically inserted into the formula in the first free floating field. Upon confirmation, the formula is calculated to insert the referenced text into the sentence. As the text in the second free floating field is updated, the formula in the first field is automatically recalculated.

Many other architectural features and UI features are described.

BRIEF DESCRIPTION OF THE DRAWINGS

FIG. 2 illustrates a screen display of a rendered document having two free floating fields and a single table that are capable of spreadsheet functionality. In FIG. 2, the free floating fields exhibit a normal "text look" and the table exhibits a "table look" during a non-editing mode.

FIG. 5 illustrates a screen display of yet another rendered document having multiple tables. In particular, FIG. 5 shows nested tables, where one table is inserted into a cell of another table, and the ability to reference from one table to the other table.

FIG. 6 illustrates a screen display of another rendered document having multiple tables and a free floating field that appear in an edit mode.

DETAILED DESCRIPTION

This disclosure describes an architecture that integrates spreadsheet functionality into word processing text. The architecture allows insertion of discrete individual fields, referred to as "free floating fields", inline with normal textual sentences. The free floating fields offer spreadsheet functionality, including the ability to handle complex formulas, reference values in a separate free floating field or table, and automatically recalculate the formulas when a referenced value changes. The values and formula results can also be independently formatted (e.g., numbers, date, times, currency, etc.), like spreadsheet cells, while remaining part of the normal text of a document. The results of formulas and data values may also be formatted like normal text, using familiar text formatting tools.

The architecture also supports integration of spreadsheet functionality into word processing tables. The tables resemble a spreadsheet when being edited, and a table when not being edited. The tables enjoy the benefits of word processing tables (e.g., size and shape formatting, spell and grammar checking, etc.) as well as the benefits of spreadsheets (e.g., complex formulas, sorting, recalculation, etc.). The architecture also allows cross referencing among tables and free floating fields such that, when the content of one table cell or free floating field is modified, the architecture automatically recalculates any formulas in all tables and free floating fields that are affected by the modification. With this architecture, spreadsheet functionality is no longer constrained to grids, but is available in customary text and across table boundaries.

For discussion purposes, the architecture is described in the context of creating tables, text, and free floating fields in a document written in a markup language (e.g., HTML). In this manner, the user is afforded the rich HTML formatting options of both text and tables, including table layout changes (e.g., merging and splitting cells), as well as the calculation and formatting features specific to data that are traditionally associated only with a separate spreadsheet application. However, it is noted that the architecture may be useful in other document types that are not rooted in a markup language.

Architecture

Figure 1:
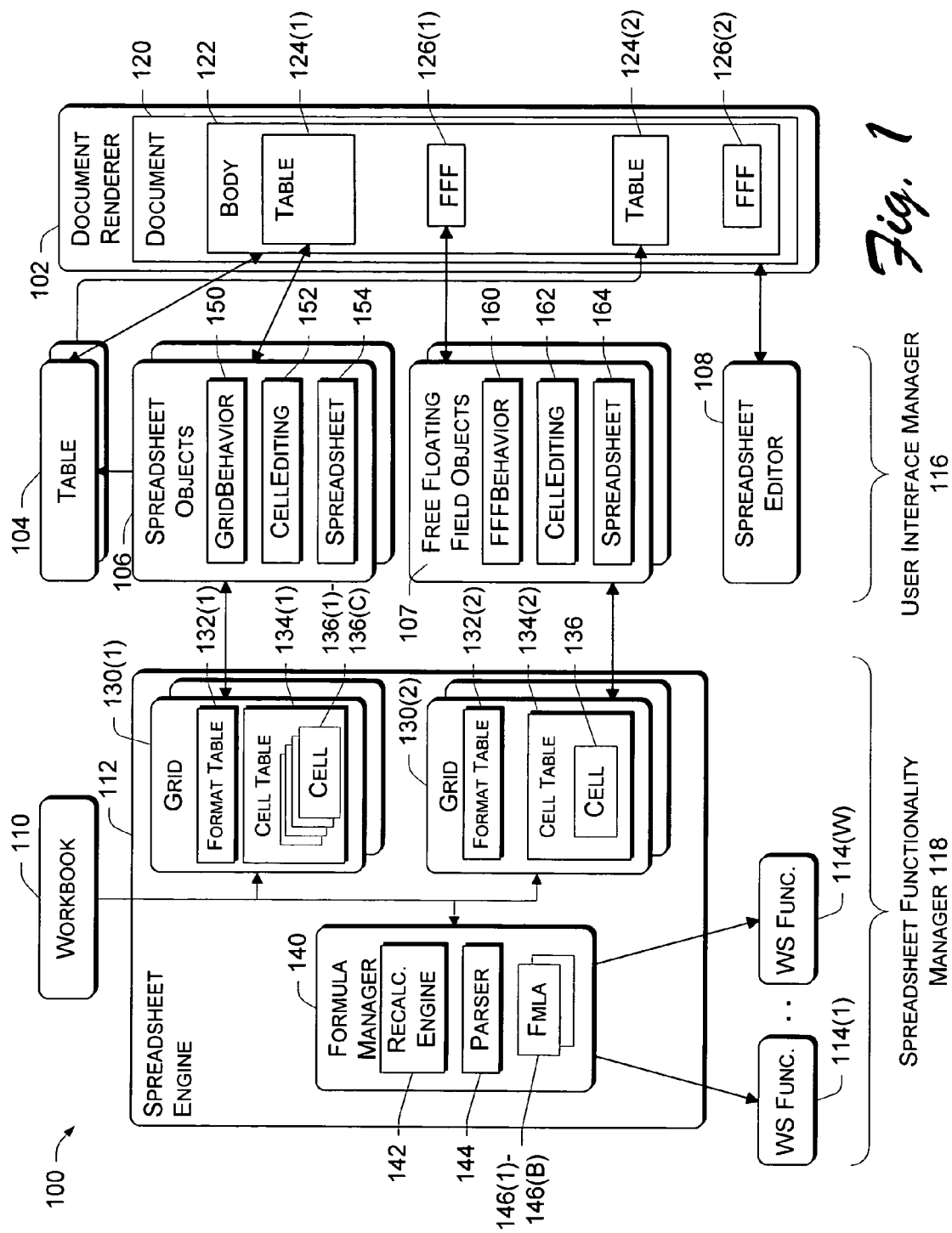
FIG. 1 is a block diagram of an exemplary architecture for integrating spreadsheet functionality into word processing text and tables.

FIG. 1 shows an exemplary architecture 100 that integrates spreadsheet functionality into word processing text. The architecture 100 may be implemented on a standalone computer, a network server computer, a network client computer, or distributed at both the server and client. The architecture 100 includes a document renderer 102, one or more sets of table objects 104, one or more sets of spreadsheet objects 106, one or more sets of free floating field objects 107, a spreadsheet editor 108, a workbook 110, a spreadsheet engine 112, and one or more non-core worksheet functions 114(1)-114(W) that may be optionally used by the spreadsheet engine 112.

The architecture 100 separates data handling functions from presentation functions of the integrated spreadsheet functionality. In this manner, the architecture may be characterized as a cooperation of two system managers: a user interface (UI) manager 116 and a spreadsheet functionality manager 118. The UI manager 116 manages how the free floating fields and tables appear in a document and facilitates such tasks as table resizing, selection, cut, copy, paste, split, merge, table formatting and so on. The UI manager 116 includes the table object 104, the spreadsheet objects 106, and the spreadsheet editor 108.

The spreadsheet functionality manager 118 manages the spreadsheet functions for the table and free floating fields, such as recalculation, formula handling, sorting, referencing, and the like. The spreadsheet functionality manager 118 includes the workbook 110, the spreadsheet engine 112 and worksheet functions 114. With the bifurcated architecture, the spreadsheet functionality manager 118 is not concerned with the table layout or other visual features, and the UI manager 116 is not concerned with data management, formulas, and recalculation processes.

The bifurcated architecture 100 is advantageous in that it supports cross-referencing among the free floating fields and tables. It also allows reference editing during formula entry to allow convenient selection of other fields or cells and capturing of their contents as references used in the formula. The architecture further facilitates automatic universal recalculation of any formulas throughout all free floating fields and tables in the document that are affected by user modification of a single reference. These goals could also be achieved using different, non-bifurcated architectures.

A document 120 is constructed and rendered on the document renderer 102. The document 120 combines a text-based body 122, one or more tables 124(1) and 124(2), and one or more free floating fields (FFF) 126(1) and 126(2). Each free floating fields 126 is akin to a single cell of a table that may be inserted anywhere in the document, including in the middle of a text-based body.

For discussion purposes, the document 120 is written in a markup language, such as XML (extensible markup language). XML documents can be transformed using XSL (extensible stylesheet language) and rendered directly as HTML (hypertext markup language). In this case, the renderer 102 may be implemented as a browser or other application that handles and renders HTML documents. The tables 124 are thus rendered as HTML tables. Examples of various documents that contain integrated spreadsheet functionality into text are illustrated in FIGS. 2-6.

With continuing reference to FIG. 1, the table and spreadsheet objects 104 and 106 provide editing functionality for the table 124, including such functions as table resizing, selection, cut, copy, paste, split, merge, table formatting, and a host of other rich spreadsheet events. The free floating field objects 107 provide similar editing functionality for the free floating fields 126, with the exception that certain functions do not make sense in the context of a free floating field. For example, it does not make sense to "split" a free floating field as one would split a table cell.

The spreadsheet engine 112 provides the spreadsheet functionality for the table 124 and free floating fields 126, including such functions as formula creation, reference editing, recalculation, and the like. Architecturally, the spreadsheet components are separate from the word processing table and text, although the spreadsheet relies on the table and free floating fields and the table and free floating fields provide special notifications and events to help the spreadsheet. This allows either component to add additional functionality without directly affecting the other component.

The spreadsheet engine 112 has a grid object for each table and free floating field in the document 120, as represented by grid objects 130(1) and 130(2). The grid objects 130 receives events indicative of user activity in the table 124 and free floating fields 126 and coordinates actions among various objects. The workbook 110 initially creates the tables 124 and free floating fields 126, and subsequently tracks all grid objects 130 to resolve any cross-table or free floating field referencing. Upon creation, a grid object 130 registers with the workbook 110 so that it can participate when tables and free floating fields are updated. The grid object 130 keeps an interface to the spreadsheet behavior 106 and the free floating field behavior 107 to fetch values from the HTML tree maintained at the renderer 102.

Each grid object 130 maintains two structures: a format table 132 and a cell table 134. The format table 132 holds information about the data format of each cell in the table 124 or associated free floating field 126. For instance, the cell or field may contain dates, numbers, dollar amounts, percentages, and so forth. In the example shown in FIG. 3, the format table 132 would contain information that cells A1-A6, B1-B6, and C1, are text and cells C2-C6 are formatted as currency in U.S. dollars. Also in FIG. 3, the format table 132(2) for free floating field 126(1) contains information that the field is formatted as currency in U.S. dollars.

The cell table 134 stores the actual data for each cell in the table 124 or an associated free floating field 126, such as text, values, and formulas. A cell table 134 stores pointers to one or more cells that physically store the data. A cell table associated with a table, such as cell table 134(1), contains multiple cells 136(1)-136(C), one for each cell in the table. A cell table associated with a free floating field, such as field 134(2), contains only one cell 136 because the free floating field 126(1) can be thought of as a table with only one cell.

Figure 3:
FIG. 3 illustrates a screen display of the rendered document, where the free floating fields exhibit a "cell look" and the table exhibits a "spreadsheet look" during an editing mode.

Each cell 136 is an object containing the parsed value of the cell and a reference to complete information about the cell. If the cell contains text or numeric data (e.g., cells A1-A6, B1-B5, and C1-C5 in FIG. 3), it is stored directly in the object. Formulas, such as the summation formula in cell C6 of FIG. 3, are stored as pointers to the appropriate formula object maintained by the formula manager 140 (discussed below).

The spreadsheet engine 112 includes a formula manager 140 to handle all formulas and parsing duties for formulas, data values, and references (e.g., D4:E23). The workbook 110 serves as the linkage between the formula manager 140 and the registered grids 130. The formula manager 140 maintains a recalculation engine 142 that performs recalculation of all formulas in response to event changes in the table or free floating fields. In one implementation, the recalculation engine 142 maintains the formulas for a document in a bi-directional linked list, sometimes referred to as the "formula chain". Following a recalculation event (e.g., user entry of a new data value or new formula), the recalculation engine 142 traverses the list, evaluating formulas that may be affected by the event.

If the current formula depends on other formulas that have not yet been evaluated, the current formula is moved to the end of the list. After one recalculation pass, the formula list is organized in natural order and will not need to be reordered during subsequent recalculations unless new formulas are added. If recalculation comes to a formula that has already been bumped to the end of the list and discovers that this formula still relies on not-yet-calculated dependencies, the formula contains a circular reference. In this case, the recalculation engine returns a circular error.

The formula manager 140 also has a parser 144 that parses the formulas. In one implementation, the parser 144 is a recursive descent parser that extracts tokens from a stream and appends them to an array of character-size operation types and a parallel array of variant operands. When done, the parser 144 creates a new formula object 146 and gives it the two arrays of parsed information. The formula manager 140 therefore maintains one or more formula objects 146(1)-146(B) that contain formula information, including the parsed formula expression returned by the parser 144, the current result, the type of formula, and the current formula state.

In one implementation, there are three types of formulas: normal, semi-calculation, and non-calculation. The normal formula is reevaluated only when its dependencies change. The semi-calculation formula is reevaluated every time the recalculation engine 142 performs a recalculation operation. The non-calculation formula is never evaluated at all. Non-calculation formulas are a special formula type for handling nested tables (i.e., a table within a table) and nested free floating fields.

Consider the case of an inner table nested inside a cell of an outer table. If the inner table contains a formula that changes to a different value following recalculation, the value of the outer table will also change. Such a dependency is not encoded anywhere, since there is no formula attached to the outer table. In such cases, a non-calculation formula is set to re-fetch the resulting value from the inner calculation. Thus, it participates in the normal dependency management of recalculation and all references to the outer table are updated when appropriate.

In one implementation, the formula objects 146 are owned by a COM wrapper (not shown), which is in turn held onto by a cell object 136 in the grid 130 where the formula resides. The formula objects 146 are themselves part of the bi-directional linked list of formulas maintained by the recalculation engine 142. The formula objects 146 contain references to the table row and column (or the free floating field) they are stored in and to the cell object 136 in grid 130. The references allow the recalculation engine 142 to travel down the recalculation chain with formulas from several tables and easily determine to which table a given formula belongs. Many operations, from formula saving to table deletion, depend on this ability to traverse the chain.

The formula manager 140 also parses referenced cell groups. As examples, the formula manager 140 parses "A5" as a cell reference, "D4:E23" as a compound rectangular reference, "$F$30" as an absolute reference, "Table5!D5" as a cross-table reference, "Field3" as a whole-table cross-table reference, "A5:D5 B3:B6" as an intersection, and "D3,E4" as a union.

The non-core worksheet functions 114(1)-114(W) are optional elements. Examples of such functions include analysis functions, statistical functions, and trigonometric functions. The modular architecture 100 makes it flexible to remove unwanted worksheet functions or add new worksheet functions.

The spreadsheet objects 106 and free floating field objects 107 are counterparts to their corresponding grid objects 130 (1) and 130(2) and are located outside of the spreadsheet engine 112. There is one pair of a spreadsheet object 106 and a grid object 130(1) per table 124 and one pair of corresponding free floating field behavior 107 and grid object 130(2) per free floating field 126.

The spreadsheet objects 106 and free floating field objects 107 define behaviors that receive events from the document renderer 102, process them, and pass the events onto the corresponding grid objects 130(1) and 130(2). In response to the events, the grid objects 130(1) and 130(2) update the cell data in cell tables 134(1) and 134(2) and/or formatting information in format tables 132(1) and 132(2).

The spreadsheet behavior 106 has three objects: GridBehavior 150, CellEditing 152, and Spreadsheet 154. The GridBehavior object 150 provides a layer of abstraction between the grid object 130 and individual HTML table cells and allows the grid object 130 to access HTML values and styles. The GridBehavior object 150 wraps the HTML elements in a common interface so that the grid 130 does not need to know the particular structure of the HTML table. Additionally, the GridBehavior object 150 manages table-specific portions of a "reference edit" operation.

The CellEditing object 152 and Spreadsheet object 154 interact directly with an HTML tree and the table behavior 104 to provide the grid 130 with events. The Spreadsheet object 154 is responsible for recording undo records for actions affecting the spreadsheet.

The CellEditing object 152 manages user-level editing of cells. It processes events related to user edits of in-cell data values and provides some editing user interface (UI) elements, including the formula edit box that permits user edits of formulas. When editing a formula, a floating formula edit box is provided above the cell's location and resized as necessary to accommodate the formula. The localized edit box eliminates a potential UI problem of forcing the user to fit the entire formula into the table cell, which may cause the table to resize strangely as the user clicked into and out of the cell.

The CellEditing object 152 also supports the reference edit operation when the formula edit box is presented. As noted above, the reference edit operation allows the user to visually reference cells using a mouse pointer (or other focus mechanism) and in response, inserts a reference to that cell data in the current formula edit box. The formula edit box is described below in more detail. The CellEditing object 152 is only present when a cell is being actively edited.

The free floating field behavior 107 has three objects: an FFFBehavior object 160, a CellEditing object 162, and a Spreadsheet object 164. The CellEditing object 162 and Spreadsheet object 164 are essentially identical to those in the spreadsheet behavior 106. For example, the CellEditing object 162 processes events related to user edits of free floating fields and provides some editing user interface (UI) elements, including the formula edit box that facilitates user entry and editing of formulas. As with table cells, when editing a formula in a free floating field, a floating formula edit box is provided above the free floating field and resized as necessary to accommodate the formula.

The FFFBehavior object 160 takes the place of GridBehavior object 150 and the Table object 104 in the context of free floating fields. Like the Table object 104, the FFFBehavior object 160 monitors the document for changes to the free floating field, although these are much more limited than in the case of a table. Like the GridBehavior object 150, the FFFBehavior object 160 provides an interface for the grid object 130(2) and manages "reference edit" operations for the free floating field.

The spreadsheet editor 108 handles top-level duties such as inserting a table or a free floating field and routing commands to the appropriate table based on the current selection in the document 120. The editor 108 also creates and manages the workbook 110.

The integrated spreadsheet table and free floating field model eliminates the need for the user to choose the structure of data within a document prior to creating that document. Historically, if the user needed more control over the presentation of the tabular data, the user tended to select a word processing application. On the other hand, if the user required computations over the data, the user typically chose a spreadsheet application. The integrated architecture allows the user to combine several different types of data within one document.

Additionally, by integrating spreadsheet functionality inside a table and inline text fields, the user can build the document as they want. In spreadsheet applications, the user is restricted to the grid layout for all document content. In the integrated architecture, users can create a rich document that contains text integrated with multiple tables and multiple free floating fields, each with data that can be formatted as values and used in calculations throughout different tables and fields.

Examples of Documents with Integrated Spreadsheet Functionality

FIG. 2 shows an example document 120 that has text body 122. In the FIG. 2 example, the document 120 is a letter written to Mr. Jones describing various home improvement projects and the costs associated with the projects. A single table 124 is situated in the text body. In the depicted non-editing view, the table 124 resembles a standard word processing table with three columns 202(1)-202(3) and five rows 204(1)-204(5).

Two free floating fields 126(1) and 126(2) are inserted in the text body 122 inline with the text. The free floating fields 126 appear as normal text in the document 120. For instance, the second sentence recites, "The total cost of the project is $12,060". The displayed value "$12,060" is a result of a formula in the underlying free floating field, which is currently hidden in this view. The formula sums the project costs listed in the table 124.

FIG. 3 shows the same document 120 during editing, where the table 124 and free floating fields 126(1) and 126(2) are shown as they would look upon selection for editing. Notice that table 124 now "looks" like a spreadsheet more than a traditional table. The table 124 has integrated column headers 302(1), 302(2), and 302(3), as well as integrated row headers 304(1)-304(6). The table 124 has a column expansion control 306 and a row expansion control 308 to permit easy expansion of the table.

It is noted that FIG. 3 is merely an illustration for discussion purposes. Typically, only one of the fields or the table is edited at a time, and hence that field or table exhibits the spreadsheet look (not all three as shown in FIG. 3). Thus, selecting the table for editing invokes the column and row headers 302 and 304. Similarly, selecting a free floating field containing a formula would display the formula edit box. If, on the other hand, a free floating field does not contain a formula it will be selected in the same manner as all surrounding text is selected.

In this example, the user has added a row to the table and is entering a summation formula in cell C6 using a reference edit operation. With a mouse pointer 310, the user references an array of cells C2 through C5 for entry into the formula. Upon confirmation (e.g., releasing the left mouse button), a reference to the cells C2-C5 are inserted into the summation formula in cell C6 and after clicking out of the cell the formula is calculated to add the dollar amounts in column C. The result of $12,060 is inserted into cell C6.

The free floating fields 126(1) and 126(2) contain formulas that reference values and/or formulas located elsewhere in the document 120. The first free floating field 126(1) contains a formula that sums the dollar amounts in cells C2-C5 of the table 124, or "=SUM(Table1!C2:Table1!C5)". The second free floating field 126(2) contains a formula that references both the first free floating field 126(1) and a value in the table. Namely, the formula in the second free floating field 126(2) computes the difference between the results of the formula in the first free floating field 126(1) and the cost of the kitchen repair in cell C3, or "=FFF1-Table1!C3".

If a value in cells C2-C5 in the table 124 is modified, the free floating fields 126(1) and 126(2) are automatically updated to reflect the modification. For instance, suppose the user modifies the cost of the family room in cell C4 from $3,500 to $4,000. As a result of this change, the formula in table cell C6 is automatically recalculated to yield $12,560, the formula in the first free floating field 126(1) is automatically recalculated to yield $12,560, and the formula in the second free floating field 126(2) is automatically recalculated to yield $7,060.

Figure 4:
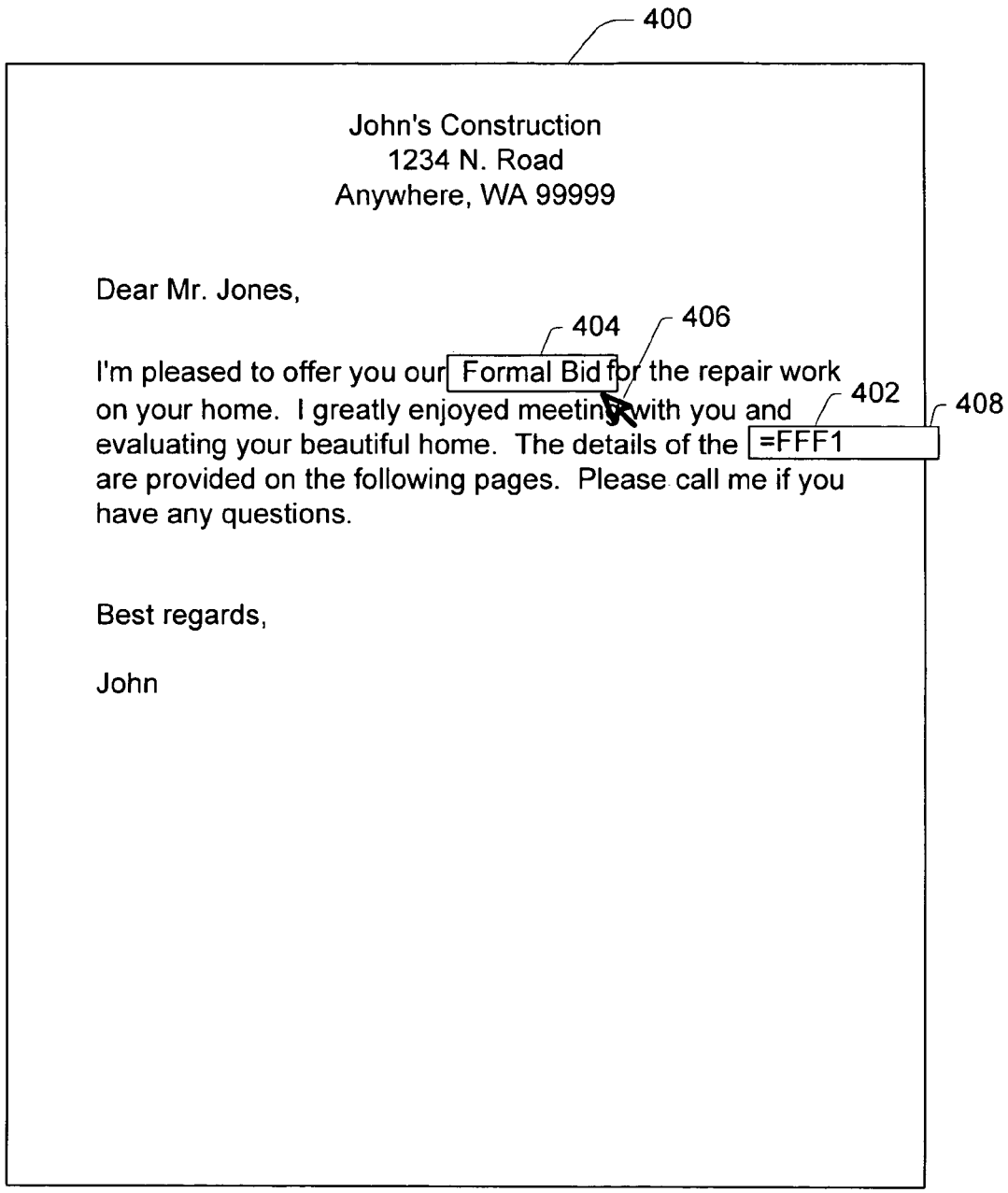
FIG. 4 illustrates a screen display of another rendered document, where a free floating field references text in the document.

FIG. 4 shows another example of a document 400 in which a free floating field 402 is used to reference text, rather than data values. In this case, free floating fields enable a new mechanism for the reference edit operation. As shown in FIG. 3, the typical reference edit operation allows entry of formula references into a spreadsheet by pointing at (i.e., clicking on) a referenced cell or range of cells while editing the formula.

The referenced cells are highlighted automatically and the correct reference to them is inserted into the formula. Free floating fields extend the reference edit operation to allow a range of normal text in a document to be referenced in a formula.

In contrast to this typical reference edit operation, the free floating field 402 in document 400 contains a formula that references a text range 404. Using a mouse pointer 406, the user selects a range of normal text 404 and the text is highlighted. A new free floating field is automatically created around the range of text 404 and a reference to that new free floating field, FFF1, is automatically inserted into the formula being edited within the formula edit box 408. In this example, the edited formula is in free floating field 402; however, in other cases, the formula may be in a table. Upon confirmation (e.g., pressing the return key), the formula is calculated and the referenced text "Formal Bid" is inserted into the sentence as part of the normal context flow.

If the referenced text 404 is modified, the free floating field 402 is automatically updated to reflect the modification. For instance, suppose the user changes "Formal" to "Final". As a result, the free floating field 402 is automatically recalculated to hold the words "Final Bid".

FIG. 5 shows a document 500 that contains a first or outer table 502 and a second or inner table 504 nested within cell B3 of the outer table 502. The ability to nest tables is one feature of this architecture that conventional spreadsheet programs do not provide. FIG. 5 further illustrates a reference edit operation across table boundaries in which the inner table 504 is being referenced for insertion into a formula in cell C3 of the outer table 502.

It is noted that the inner table 504 may be replaced by a free floating field, akin to a nested one cell table. Moreover, the outer table 502 may be replaced by a free floating field. In this manner, one or more free floating fields may be nested within one or more table cells, an entire table may be nested within a free floating field, and one or more free floating fields may be nested within one or more other free floating fields.

FIG. 6 shows a document 600 having three tables 602, 604, and 606, and a free floating field 608. Document 600 illustrates a situation where multiple tables and fields can cross-reference one another.

The many features of the user interface presented through the various rendered documents are discussed in greater detail below under the section heading "User Interface Features".

Exemplary Computing Environment

Figure 7:
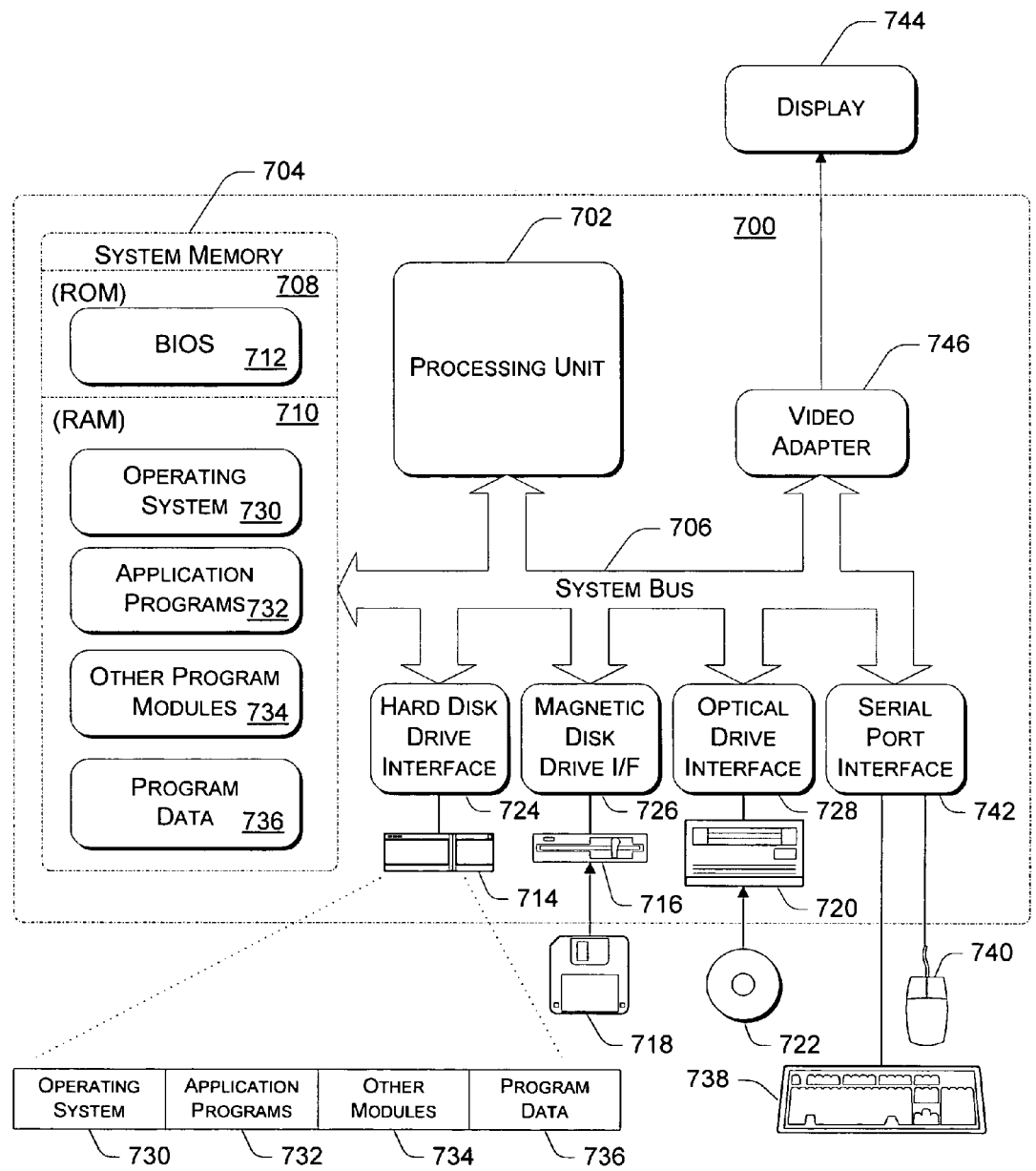
FIG. 7 is a block diagram of an exemplary computer that implements the architectures of FIGS. 1 and 4.

FIG. 7 illustrates an example of an independent computing device 700 that can be used to implement the architecture of FIG. 1. The computing device 700 may be implemented in many different ways, including a general-purpose computer (e.g., workstation, server, desktop computer, laptop computer, etc.), a handheld computing device (e.g., PDA, PIM, etc.), a portable communication device (e.g., cellular phone with computing capabilities), or other types of specialized appliances (e.g., set-top box, game console, etc.).

In the illustrated example, computing device 700 includes one or more processors or processing units 702, a system memory 704, and a bus 706 that couples the various system components including the system memory 704 to processors 702. The bus 706 represents one or more types of bus structures, including a memory bus or memory controller, a peripheral bus, an accelerated graphics port, and a processor or local bus using any of a variety of bus architectures. The system memory 704 includes read only memory (ROM) 708 and random access memory (RAM) 710. A basic input/output system (BIOS) 712, containing the basic routines that help to transfer information between elements within the computing device 700 is stored in ROM 708.

Computing device 700 further includes a hard drive 714 for reading from and writing to one or more hard disks (not shown). Some computing devices can include a magnetic disk drive 716 for reading from and writing to a removable magnetic disk 718, and an optical disk drive 720 for reading from or writing to a removable optical disk 722 such as a CD ROM or other optical media. The hard drive 714, magnetic disk drive 716, and optical disk drive 720 are connected to the bus 706 by a hard disk drive interface 724, a magnetic disk drive interface 726, and a optical drive interface 728, respectively. Alternatively, the hard drive 714, magnetic disk drive 716, and optical disk drive 720 can be connected to the bus 706 by a SCSI interface (not shown). It should be appreciated that other types of computer-readable media, such as magnetic cassettes, flash memory cards, digital video disks, random access memories (RAMs), read only memories (ROMs), and the like, may also or alternatively be used in the exemplary operating environment.

A number of program modules may be stored on ROM 708, RAM 710, the hard disk 714, magnetic disk 718, or optical disk 722, including an operating system 730, one or more application programs 732, other program modules 734, and program data 736. As one example, the architecture 100 may be implemented as one or more programs 732 or program modules 734 that are stored in memory and executed by processing unit 702. The drives and their associated computer-readable media provide nonvolatile storage of computer-readable instructions, data structures, program modules and other data for computing device 700.

In some computing devices 700, a user might enter commands and information through input devices such as a keyboard 738 and a pointing device 740. Other input devices (not shown) may include a microphone, joystick, game pad, satellite dish, scanner, or the like. In some instances, however, a computing device might not have these types of input devices. These and other input devices are connected to the processing unit 702 through an interface 742 (e.g., USB port) that is coupled to the bus 706. In some computing devices 700, a display 744 (e.g., monitor, LCD) might also be connected to the bus 706 via an interface, such as a video adapter 746. Some devices, however, do not have these types of display devices. Computing devices 700 might further include other peripheral output devices (not shown) such as speakers and printers.

Generally, the data processors of computing device 700 are programmed by means of instructions stored at different times in the various computer-readable storage media of the computer. Programs and operating systems are typically distributed, for example, on floppy disks or CD-ROMs. From there, they are installed or loaded into the secondary memory of a computing device 700. At execution, they are loaded at least partially into the computing device's primary electronic memory. The computing devices described herein include these and other various types of computer-readable storage media when such media contain instructions or programs for implementing the steps described below in conjunction with a microprocessor or other data processor. The service system also includes the computing device itself when programmed according to the methods and techniques described below.

For purposes of illustration, programs and other executable program components such as the operating system are illustrated herein as discrete blocks, although it is recognized that such programs and components reside at various times in different storage components of the computing device 700, and are executed by the data processor(s) of the computer.

It is noted that the computer 700 may be connected to a network via a wire-based or wireless connection to interact with one or more remote computers. In this network context, the computer 700 may be configured to store and execute portions of the architecture 100, while one or more remote computers store and execute other portions of the architecture. For example, the document renderer 102 may reside on one computer, while the remaining components reside on a separate computer. As a result, the architecture is distributed, with various components being stored on different computer-readable media.

General Operation

Figure 8:
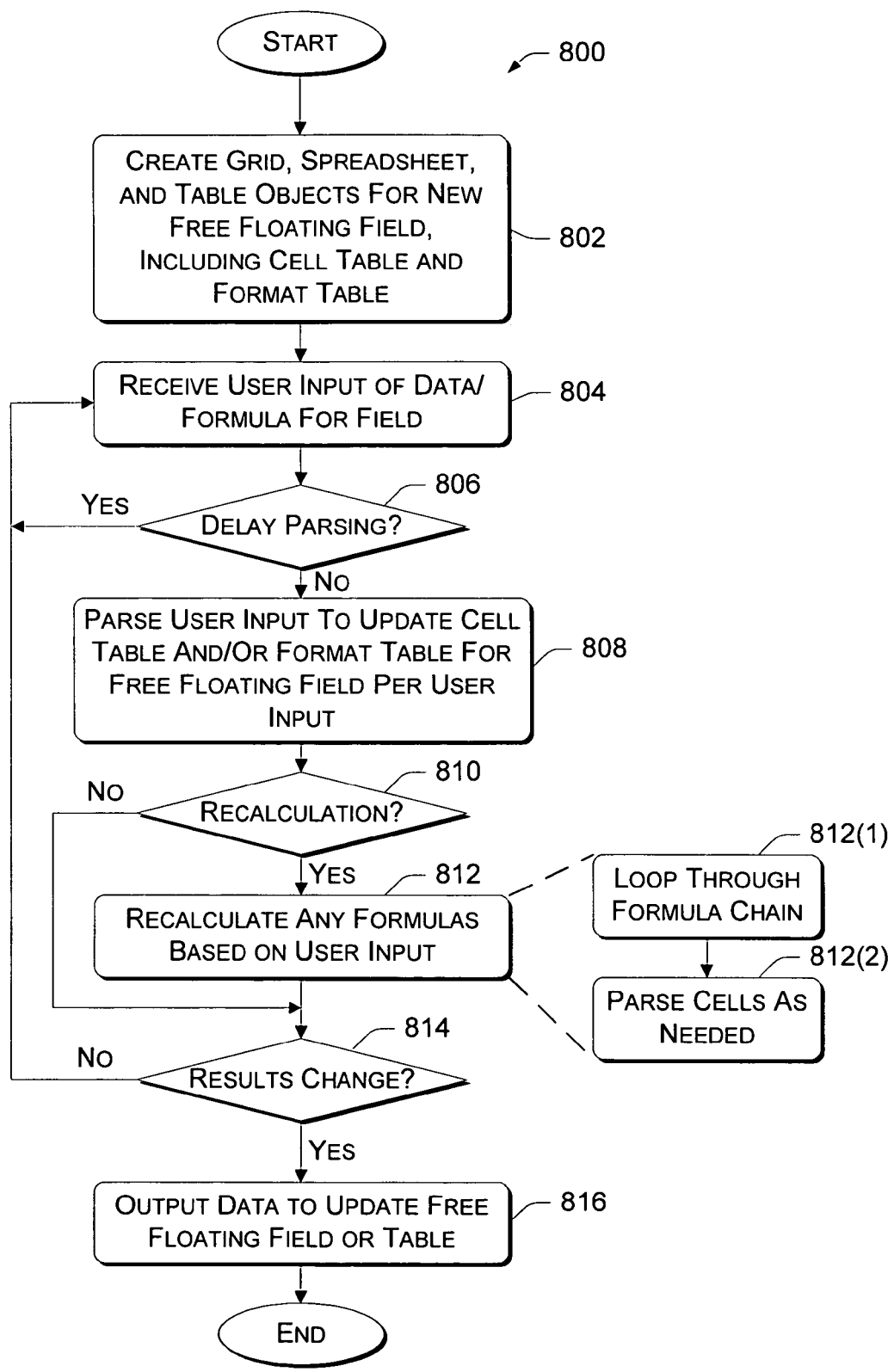
FIG. 8 is a flow diagram of a process implemented by the architecture of FIG. 1.

FIG. 8 shows a table/spreadsheet process 800 implemented by the architecture 100 of FIG. 1. The process 800 may be embodied in software stored and executed on a computer, such as computing device 700 in FIG. 7. Accordingly, the process 800 may be implemented as computer-executable instructions that, when executed on a processing system such as processor unit 702, perform the operations and tasks illustrated as blocks in FIG. 8.

At block 802, the architecture 100 creates a corresponding pair of free floating field and grid objects 107 and 130 for a new free floating field presented as part of the document. In one implementation, the FFFBehavior object 160, CellEditing object 162, and Spreadsheet object 164 are initially created for the new free floating field and then the Spreadsheet object 164 creates an associated grid object 130(2) in the spreadsheet engine 112. The grid object 130(2) includes a format table 132(2) and a cell table 134(2). If this is the first spreadsheet, a workbook 110 is also created. The grid 130 and workbook 110 then create other objects, including the formula manager 140 and a cell object 136.

At block 804, in response to the user entering data and/or formulas into the free floating field, the architecture receives the user entry and passes it to the spreadsheet engine 112 for processing. More specifically, in the continuing exemplary implementation, the Spreadsheet object 164 receives a notification from the document renderer 102 and passes it along to the grid 130(2) for the new free floating field.

At block 806, based on the user input, the architecture determines whether to parse the user-entered information or delay parsing until later. The architecture preferably employs a delay parser that parses fields and table cells when necessary, such as the first time that a formula has been loaded or the first time a value has been edited or referenced. If the field contains a formula, the cell is parsed immediately and added to the recalculation chain. If the field does not contain a formula, it is left unparsed until a formula requires its value.

At block 808, assuming that parsing is needed now (i.e., the "no" branch from block 806), the architecture parses the user-entered information and updates the format table 132 and cell table 134 based upon this information. At block 810, the architecture determines whether recalculation is appropriate. Some user input may not require recalculation, such as insertion of a new data value that is not referenced by a formula. If recalculation is not needed, flow continues at block 814 to determine whether the fields need to be updated as a result of the user input.

At block 812, assuming recalculation is appropriate (i.e., the "yes" branch from block 810), the architecture recalculates the various formulas that may have been affected by the user input. In the ongoing example, the act of putting a value into a cell 136 in the cell table 134 triggers a data-changed notification to registered listeners, which includes the grid objects 130(1) and 130(2). The grid objects identify any changed cells and forward the notification to the formula manager 140, which marks any formulas depending on the changed cells as dirty and in need of recalculation.

The grid objects 130 then call the recalculation engine 142, which loops over the recalculation formula chain and recomputes the variously affected formulas (block 812(1)). While evaluating the formulas in the formula chain, unparsed cells that were previously left unparsed may now be parsed (block 812(2)).

Once the recalculation engine 142 finishes, it returns control to the workbook 110. The workbook 110 calls back to the recalculation engine 142 to learn which formulas changed as a result of the recalculation cycle. The workbook 110 then locates the grid objects 130 that hold the formulas and calls them to save the cells that contain the formulas.

At block 814, the architecture 100 determines whether any results have changed following the recalculation. If results have not changed (i.e., the "no" branch from block 814), process flow continues at block 804 for the next user input. Conversely, if the results have changed (i.e., the "yes" branch from block 814), the architecture 100 loads an updated free floating field with the modified value and renders the updated free floating field as part of the document (block 816).

It is noted that the above example assumed that the user entered data or a formula. The user may also change the format of the free floating field. The process 800 handles format changes in essentially the same way, but accounts for those changes in the format table 132(2) rather than the cell table 134(2).

User Interface Features

The architecture 100 supports many user interface (UI) features in the rendered document to convey integration of spreadsheet functionality into word processing tables and text. These UI features are described separately below, with reference to FIGS. 2-6. Hand-in-hand with these features are the underlying operations and inner workings of various components in the architecture 100. These aspects will be described in more detail later in this disclosure under the heading "Functionality Features".

One of the primary benefits of integrating spreadsheet functionality into text and tables is that the user need no longer think in terms of whether the document should be primarily a spreadsheet document produced by a spreadsheet application (e.g., an ".xls" file from the "Excel" program) or primarily a word processing document produced by a word processing application (e.g., a ".doc" file from the "Word" program). Instead, the user creates an HTML document (or other markup-based document, such as an XML document) that can have both text and spreadsheet/table components. By integrating spreadsheet functionality into text, the user can build the document with automatically updateable fields without being restricted to the grid layout.

Integrated Headers

The table 124 toggles between a "table look" (FIG. 2) and a "spreadsheet look" (FIG. 3) depending upon whether the user is editing the table. The spreadsheet look may be invoked in a number of ways, including by actively editing a cell, by hovering a pointer over the table, or by some other activity. As illustrated in FIG. 3, the spreadsheet look includes column headers 302(1)-302(3) and row headers 304(1)-304(6) that integrate with the table columns and rows, respectively. Visually, the column headers 302 appear just above the columns and are labeled with letters A, B, C, etc., where as the row headers 304 reside to the left of the rows and are labeled with numbers 1, 2, 3, etc.

Smart Selection

When the user selects text inside or outside a table, the architecture intelligently discerns the type of content in the cell or free floating field. For instance, the architecture determines whether the cell or free floating field contains a data value, text, or a formula. If the selected cell or free floating field contains text or a value, the UI exhibits the selection as a character-based cursor ready for cell editing. If the selected cell or free floating field contains a formula, the UI exhibits the selection by highlighting the entire result of the formula. A second selection gesture will allow the user to edit the formula within the formula edit box.

Key Processing

Certain keys have different interpretations depending upon the contents of the cell. This dynamic interpretation accommodates the competing interests of a word processing table and a spreadsheet. As an example, the "Enter" key typically means return in word processing, whereas it means move to the next cell and commit the formula in a spreadsheet program.

If the cell contains text (e.g., cells A1-A6, B1-B5, and C1 in FIG. 3), the architecture interprets this cell as primarily being a word processing-based cell and treats the keys as if the user were working within a word processing application. Thus, an "Enter" key means return, a "tab" key means tab over some distance, the "=" key is typed in anywhere but the beginning of the cell as the equals symbol without denoting a formula, and so forth. The same behavior is applied when the user is editing text within a paragraph or a free floating field.

If the cell or free floating field contains a formula or a data value (e.g., cells C2-C6 and FFF1 in FIG. 3), the architecture interprets this cell as primarily being a spreadsheet-based cell and treats the keys as if the user were working within a spreadsheet application. Thus, an "Enter" key and "tab" key mean navigation commands to move to the next cell or move outside the free floating field, the "=" key at the beginning of a cell implies the start of a formula, and so forth.

Table Expansion

Spreadsheet users are accustomed to the look and feel of an infinite grid. While the spreadsheet look of FIG. 3 does not have the same infinite grid feel, the table 124 has a column expansion control 306 and a row expansion control 308 that allow easy addition of columns and rows, respectively. The controls 306 and 308 include an actuatable addition icon together with a dashed column/row to suggest that additional columns and rows may be added by simply actuating the icon.

Resize Behavior

The table 124 preserves column width and wraps text as the user enters sentences and phrases. In FIG. 3, notice that item 2 in cell B5 wraps within the cell, rather than resizing the column width to accommodate the entire item.

Formula Edit Box

The architecture provides a formula edit box for inserting or editing a formula in a table cell or free floating field. The formula edit box overlays the original cell or free floating field in which the formula resides and initially defaults to the size and shape of the cell or underlying text. If the formula exceeds the initial size, the formula edit box is resized to accommodate the formula. During resizing, the formula edit box initially grows horizontally in length, and then vertically in depth. The underlying table or paragraph does not resize. The ability to resize the local formula edit box, rather than the cell and the table or the paragraph, eliminates a potential UI problem of watching the table or paragraph resize strangely as the user clicks into and out of the cell containing the formula.

Examples of the formula edit box are illustrated in FIGS. 3, 4, 5 and 6. In FIG. 3, a formula edit box 312 hovers over cell C6 to accept the summation formula. Additionally, formula edit boxes appear over 126(1) and 126(2). In FIG. 4, a formula edit box 408 appears for formula 402. In FIG. 5, a formula edit box 506 floats above cell C3 and is resized to accommodate the expanded formula. Notice that the underlying table cell C3 and the table as a whole is not resized. In FIG. 6, a formula edit box 610 resides above the free floating field 608 and is resized to hold the long formula.

Reference Edit

The table 124 and free floating field 126 allow the user to perform a reference edit operation, in which the user references one or more cells to extract their data values for inclusion in a formula in another cell or free floating field. In FIG. 3, the user begins entering a summation formula (i.e., "=SUM") in the formula edit box 312 above cell C6. The user then references cells C2 through C5 using a pointer 310 or some other mechanism. The referenced cells C2:C5 are highlighted or otherwise indicated as being selected, as represented by the bold rectangular box around the cells.

When the user finishes selecting the desired cells (e.g., releasing the left mouse button after highlighting cells C2:C5), references to the cells are added to the summation formula in formula edit bock 312 (i.e., "=SUM(C2:C5)"). Upon further confirmation by the user (e.g., pressing the "Enter" key), an update event is generated and the architecture 100 recalculates the formula and updates the cell C6 to display the sum of the cells C2:C5, or $12,060, in cell C6.

Reference Edit for Text

Free floating fields provide a unique mechanism for creating references to text via a reference edit operation. In FIG. 4, the user begins entering a formula (i.e., "=") into a formula edit box 408 overlaying a free floating field 402. The user then references the text 404 using a pointer 406 or some other mechanism. The referenced text string is highlighted or otherwise indicated as being selected and a second free floating field is automatically formed around the text range 404.

When the user finishes selecting the text range (e.g., releasing the left mouse button after highlighting text 404), a reference to the newly created free floating field is added to the formula in formula edit box 408 (i.e., "=FFF1"). Upon further confirmation by the user (e.g., pressing the "Enter" key), an update event is generated and the architecture 100 recalculates the formula and updates the free floating field 402 to display the text "Formal Bid". It is noted that the reference could be made to text within a table cell, to text outside the table or to text inside the table elsewhere in the cell or in another cell.

Cross-Table Referencing and Universal Recalculation

The architecture 100 supports cross-table and cross-field references where a cell in one table or field contains a formula referencing a cell in another table. The architecture 100 also supports cross-table and cross-field reference edit operations that permit a user to reference a cell in one table or a free floating field when entering a formula into another table.

FIG. 6 illustrates cross-table referencing, where table 606 contains references to tables 602 and 604. All three tables are separate and independent from one another, and architecturally have their own set of grid, spreadsheet and table objects 130, 106, and 104. In FIG. 6, cell B2 in table 606 contains a summation formula for adding values in cells B2 and B3 of table 602 (i.e., =SUM(Table1!B2:Table1!B3)). Cell B3 in table 606 contains a summation formula for adding values in cells B2 through B4 in table 604 (i.e., =SUM(Table2!B2:Table2!B4)).

The ability to cross-reference other tables or free floating fields is beneficial in that all tables and free floating fields can be universally updated for any change in just one of the tables. For example, suppose the user changes the value in cell B2 of table 602 from $300 to $400. As a result of this change, table 602 is updated to reflect the new value $400 and the total amount in cell B6 is updated from $3,060 to $3,160. Additionally, the value in cell B2 of table 606 is updated to $2,400, causing the total amount in cell B4 in table 606 to be changed from $7,800 to $7,900.

The cross-table referencing is a significant improvement over conventional OLE techniques of embedding a spreadsheet object within a word processing document. With OLE, each spreadsheet object is independent from each other and cannot reference cells in one another automatically. Since there is no cross-referencing ability, the OLE approach cannot support universal updating throughout the document's spreadsheets as a result of changing a value in one spreadsheet.

Free Floating Field Reference Edit

The reference edit operation and cross-referencing is also available when entering a formula for a free floating field. Consider the document 600 in FIG. 6. The writer is attempting to summarize the total cost of all work items in the opening paragraph. Rather than typing in a hard value, the user decides to insert a free floating field 608 that will hold the total for the job. By using a free floating field 608, the amount can be automatically updated as other estimates in the underlying tables are modified.

Using a reference edit operation, the user can enter the formula in the edit box 610 for free floating field 608 by selecting cell B6 in table 602 to capture element "Table1!B6" and then selecting cell B8 in table 604 to capture element "Table2!B8". When the user confirms this formula, the formula edit box 610 disappears and the total value of "$12,060" is inserted into the free floating field 608.

In the event the user subsequently changes the estimate of any item in tables 602 or 604, the total value in free floating field 608 is automatically updated. Extending a previous example, suppose the user changes the value in cell B2 of table 602 from $300 to $400. As a result of this change, table 602 is updated to reflect the new value $400 and the total amount in cell B6 is updated from $3,060 to $3,160. The value in cell B2 of table 606 is updated to $2,400, causing the total amount in cell B4 in table 606 to be changed from $7,800 to $7,900. Additionally, the total amount in free floating field 608 is updated from $12,060 to $12,160. All of the updating throughout the tables and free floating fields is performed automatically in response to the user's change of a single cell in a single table.

It is further noted that a free floating field may reference another free floating field. For instance, another free floating field may be added in document 600 to reference the first free floating field 608, or a combination of the free floating field 608 and a table cell in tables 602, 604, and 606.

Nesting

The architecture 100 supports tables and free floating fields nested within one another. FIG. 5 illustrates a situation in which an inner table 504 is nested within a cell B3 of outer table 502. The two tables are independently managed and each has its own underlying pair of grid object 130 and spreadsheet objects 106. In this example, cell C3 in outer table 502 is referencing an array of cells B1:B3 in inner table 504, as represented by the summation formula in formula edit box 506. Notice that the reference syntax "Table2!B1" in the formula edit box refers to a separate table and not to cell B3. This is essentially the same cross-table reference edit operation described above, even though the reference is to a table nested within another table cell.

Similarly, a free floating field may be nested within a table cell, or, vice versa, a table may be nested within a free floating field. In addition, one or more free floating fields may be nested within one or more other free floating fields. Essentially, the architecture and UI supports any nesting arrangement involving tables and free floating fields.

The nesting architecture is another feature that is an improvement over conventional table and spreadsheet approaches. OLE mechanisms of embedding a spreadsheet object within a word processing document do not support nested tables.

Common Document Behaviors

The architecture allows common document behaviors for the text body and across the tables. Such functions as spell checking, grammar checking, find, and replace are continuous across table and free floating field boundaries, treating the cell and free floating field contents as if they were part of the document. Moreover, text formatting carries across boundaries. Essentially, any features that are added to modify the text can similarly be applied across a table boundary or free floating field to text inside a table or free floating field. The conventional OLE mechanisms of embedding a spreadsheet object within a word processing document were incapable of supporting these common document behaviors that traversed table boundaries.

The benefits of this feature are especially apparent for free floating fields. If a user selects an entire paragraph containing several free floating fields, the user can format the paragraph. The formatting will apply to the normal text as well as to all of the free floating fields within the paragraph.

Functionality Features

This section describes how the architecture functionally supports the user interface features described above, including recalculation, reference edit mechanics, cross-table referencing, the formula edit box, and structure changes to the table. These functionality features are described separately below.

Data v. Presentation

The architecture 100 separates data functions from presentation functions of the integrated table/spreadsheet by employing dual objects per table or free floating field. As shown in FIG. 3, there is one pair of spreadsheet and grid objects for each table or floating field. The grid object 130 maintains the data and format information, and facilitates the recalculation process. The corresponding spreadsheet objects 106 and free floating field objects 107 are more concerned with presenting the table and free floating field as part of the document, as well as capturing user inputs into the table and free floating field.

The separation is beneficial because it allows the architecture to support cross-table referencing, reference editing to other tables, and universal recalculation throughout the document. The underlying grid objects do not care how the tables or free floating fields are laid out or where they appear in the document, nor do they care if there are one or multiple grid objects. Similarly, the spreadsheet objects 106 and free floating field objects 107 do not worry about the data and formulas, or the recalculation process.

Recalculation

Recalculation is a function performed by the architecture 100 in response to modification of a table or free floating field. When a modification is made, the architecture 100 recalculates the various formulas in all tables and free floating fields in the document that may have been affected by user input.

Continuing the example of FIG. 6, when the user changes the value in cell B2 of first table 602 from $300 to $400, the recalculation engine 142 in spreadsheet engine 112 recalculates the formulas in cell B6 of first table 602 to update the amount from $3,060 to $3,160. The recalculation engine 142 also re-computes the formula in cell B2 of third table 606 to yield $2,400 and the formula in cell B4 in third table 606 to yield $7,900. Finally, the recalculation engine 142 recalculates the formula in free floating field 608 to update the value from $12,060 to $12,160. This recalculation occurs automatically across the entire document in response to the user input.

Figure 9:
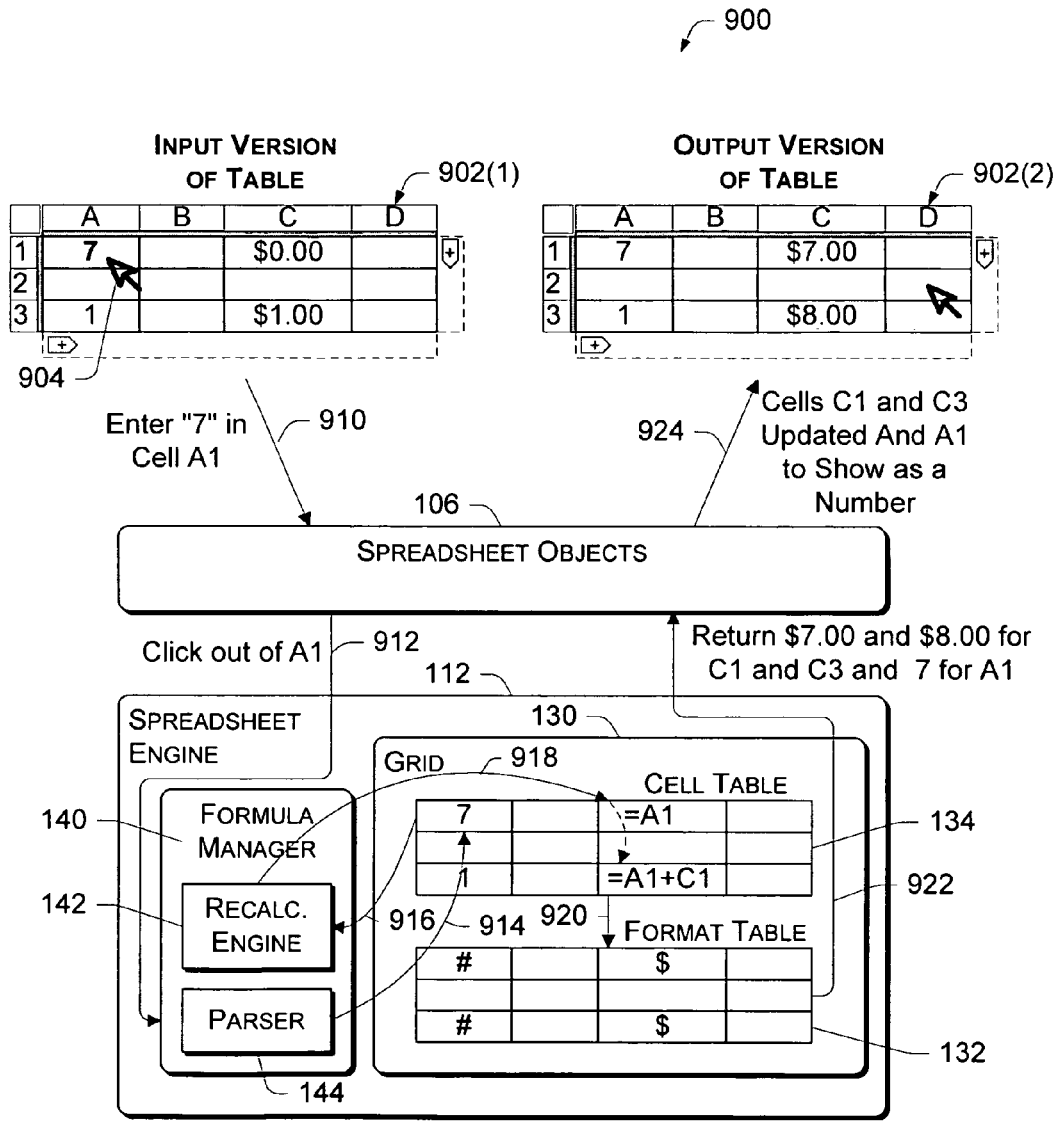
FIG. 9 is a diagrammatic illustration of how a user interface table in a rendered document and underlying functional components in the architecture work together during a recalculation operation.

FIG. 9 illustrates the recalculation process 900 for a single table in more detail. An input version of the user interface table 902(1) is shown at a time when the user enters a new value "7" in cell A1, but has not yet confirmed the entry (e.g., by hitting the "Enter" key or clicking out of the cell). An output version of the UI table 902(2) is shown at a time just after user confirmation.

A corresponding pair of spreadsheet and grid objects 106 and 130 exists for the table 902. The grid object 130 maintains a cell table 134 and a format table 132. Prior to user entry of "7" into cell A1, cell table 134 contains a value "1" in cell A3, a formula referencing cell A1 (i.e., "=A1") in cell C1, and a formula summing cells A1 and C1 (i.e., "=A1+C1") in cell C3. The format table 132 indicates that cell A3 is formatted as a number, and that cells C1 and C3 are formatted as currency in U.S. dollars. The input version of UI table 902(1) shows results of the formatted formulas as $0.00 in cell C1 and $1.00 in cell C3.

Now, suppose the user enters the value "7" into cell A1 of UI table 902(1), as indicated by the pointer 904. The value is received at the spreadsheet objects 106, as indicated by flow arrow 910. Once the user confirms this entry by moving the selection out of the cell A1, the newly entered value "7" is passed to the spreadsheet engine 112 and particularly, the parser 144 of formula manager 140 (flow arrow 912).

The parser 144 parses the entry and determines it to be a data value. The parser 144 puts the data value into cell A1 of the cell table 134 (flow arrow 914). This insertion causes a table change event, which is sent to the recalculation engine 142 to initiate a recalculation (flow arrow 916). The recalculation engine 142 runs through the formula chain to recalculate any formula anywhere that is affected by the new data value in cell A1. In this case, the formulas in cells C1 and C3 are affected and hence, these formulas are recalculated (flow arrow 918). The recalculation produces a result of "7" in cell C1 and a result of "8" in cell C3.

Afterwards, the format table 132 is consulted to determine the desired format for the new value and recalculated formulas (flow arrow 920). Here, the formula results are formatted as currency as indicated by the "$" symbols in cells C1 and C3, and the new value "7" is formatted as a number as indicated by the "#" symbol in cell A1.

The spreadsheet engine returns the formatted results $7.00, $8.00, and 7 to the spreadsheet objects 106 (flow arrow 922). The spreadsheet objects 106 updates the table with these formatted results to produce the output version of the UI table 902(2) (flow arrow 924).

The recalculation event is essentially instantaneous. The user merely sees an immediate change in the UI table from input version 902(1) to output version 902(2).

The above example of recalculation was described in the context of tables. However, it is noted that essentially the same recalculation operations may be performed in free floating fields, as is described below in more detail.

Reference Edit Mechanics

The reference edit mechanism allows the user to reference another cell to obtain data, rather than forcing the user to type in a value or the reference syntax. In FIG. 9, consider the situation when the user created the formula "=A1" in cell C1. The user selects cell C1, types in an "=" sign to indicate a formula, and then references the cell A1 by moving the mouse pointer 904 to cell A1 and clicking. The spreadsheet objects 106 (namely, CellEditing object 152) capture this reference and pass it to parser 144. The parser 144 recognizes it as a formula, creates a formula object and inserts the formula into a cell of cell table 134, as indicated by cell C1. Again, a similar mechanism may be used for free floating fields.

Cross-Table and Field Referencing and Universal Recalculation

With architecture 100, reference editing may be extended across multiple tables and free floating fields distributed throughout a document. A cell in one table or a free floating field may reference a cell in another table, a different free floating field, or a combination of a table cell and free floating field. The architecture 100 automatically recalculates all tables and free floating fields that are affected by a change in any one table cell or free floating field.

Figure 10:
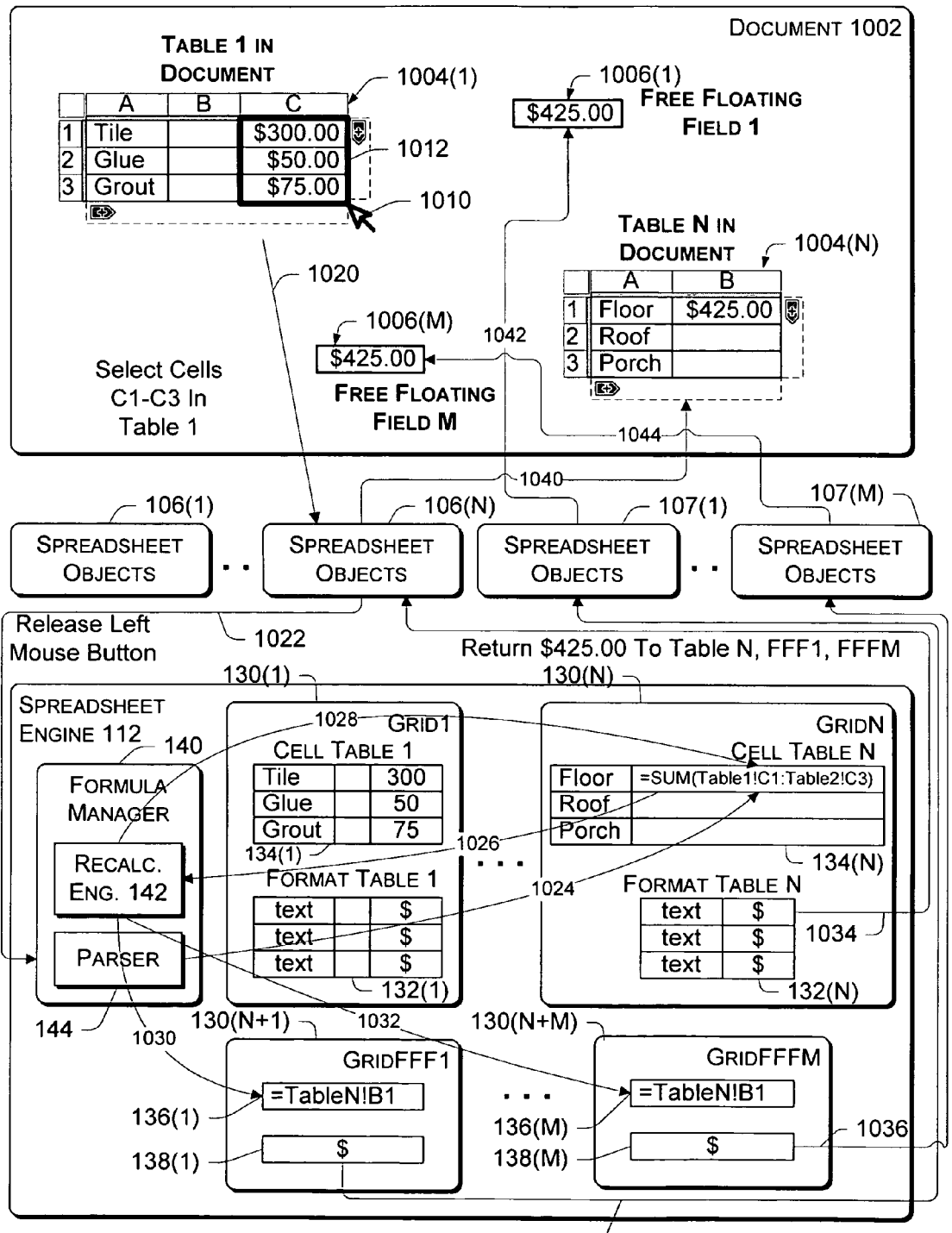
FIG. 10 is a diagrammatic illustration of how multiple free floating fields and UI tables and underlying functional components in the architecture work together during a cross-table reference edit operation and a concurrent recalculation operation.

FIG. 10 illustrates the recalculation process 1000 for a document 1002 containing multiple tables 1004(1), . . . , 1004(N) and multiple free floating fields 1006(1), . . . , 1006(M) distributed throughout the text body. A corresponding set of spreadsheet, free floating field, grid objects 106, 107 and 130 is created for each table 1004(1)-1004(N) and each free floating field 1006(1)-1006(M) in the document 1002.

In this illustration, spreadsheet object 106(1) and associated grid object 130(1) support UI table 1004(1), spreadsheet object 106(N) and associated grid object 130(N) support UI table 1004(N), free floating field object 107(1) and associated grid object 130(N+1) support free floating field 1006(1), and free floating field object 107(M) and associated grid object 130(N+M) support free floating field 1006(M). The table grid objects 130(1)-130(N) each contain a cell table 134(1)-134(N) and a format table 132(1)-132(N). The FFF grid objects 130(N+1)-130(N+M) each contain a single cell 136(1)-136(M) and a corresponding format cell 138(1)-138(M).

Suppose the user is entering a summation formula in cell B1 of UI table 1004(N) that adds three cells C1-C3 in table 1004(1). Rather than typing in the reference syntax (i.e., "=SUM(Table1!C1:Table1!C3)"), the user may simply move the pointer 1010 to table 1004(1) and select the desired array of cells, as indicated by the selection block 1012. The spreadsheet object 106(N) (namely, the CellEditing object) associated with the source table 1004(N) recognizes the reference edit operation and captures the selected cells C1-C3 in remote referenced table 1 (flow arrow 1020). When the user confirms this entry by moving the selection out of the referenced table 1004(1), the newly entered formula "=SUM(Table1!C1:Table1!C3)" is passed to the spreadsheet engine 112 and particularly, the parser 144 of formula manager 140 (flow arrow 1022).

The parser 144 determines that the entry is a formula and creates a formula object (not shown) and adds the formula to the formula chain. The parser 144 puts the formula into cell B1 of the cell table 134(N) in cell table N (flow arrow 1024). This insertion generates a table change event, which is sent to the recalculation engine 142 to initiate a recalculation (flow arrow 1026).

The recalculation engine 142 runs through the entire formula chain to recalculate any formula in any table or free floating field that is affected by adding the new formula in cell B1. In this case, the formulas in free floating cells 136(1) and 136(M) are affected. But, since these formulas rely on the result of the newly entered formula in table N, they are moved to the end of the formula chain. Thus, the new formula is first calculated (flow arrow 1028), and then the formulas in free floating field cells 136(1) and 136(M) are recalculated (flow arrows 1030 and 1032). The recalculation produces a result of "425" for table cell B1 in cell table N, a result of "425" in FFF cell 136(1), and a result of "425" in FFF cell 136(M).

Afterwards, the various format tables 132(N) and format cells 138(1) and 138(M) are consulted to determine the desired format for the results of the recalculated formulas. Here, all formula results are formatted as currency as indicated by the "$". The spreadsheet engine 112 returns the formatted results "$425.00" to the associated spreadsheet objects 106(N), 107(1), and 107(M) (flow arrows 1034, 1036, 1038). The spreadsheet objects then update their associated table and free floating fields with these formatted results to produce the output as shown in FIG. 10 (flow arrows 1040, 1042, 1044).

Once again, the recalculation event is essentially instantaneous and the user merely perceives an immediate change in the affected UI table and free floating fields throughout the document 1002.

Formula Edit Box

The CellEditing objects 152 and 162 manage the formula edit box that permits user edits of formulas in table cells and free floating fields. The formula edit box is provided in the user interface in response to the user entering the "=" symbol at the beginning of a cell. The formula edit box is overlaid as a separate entry field above the cell or free floating field into which the user is inserting a formula. The CellEditing object 152 or 162 captures the user entry of various variants in the formula, and facilitates reference editing to other cells or free floating fields as a way to input values. When the formula is entered via the formula edit box and confirmed, the CellEditing object 152 or 162 passes the formula to the formula manager 140 in the spreadsheet engine 112 for parsing. The formula edit box is then removed from the user interface.

Structural Changes

The Table object 104 manages and monitors the user input for structure changes, such as insertion/deletion of a row, merging cells, and so forth. When the user makes a structure change, the Table object 104 fires events to the GridBehavior object 150, which informs the spreadsheet engine 112, and in turn updates the cell table 134 associated with the UI table.

As above, any change to the cell table causes an event that is returned to the recalculation engine 142 to initiate a recalculation cycle. The recalculation engine steps through the chain of formulas and updates all cells affected by the structural change, returning any errors that might arise from the structure change (e.g., loss of a reference value as a result of deleting a row/column). The spreadsheet engine then outputs the results of the recalculation and the UI table is updated to reflect the structural change and the recalculation results.

Cut, Copy, Paste

A separate document object may be employed to manage operations affecting the entire document, rather than a specific table or free floating field. The document object plays a role in initially inserting the table/spreadsheet or free floating field into the document. The document object may be constructed similarly to the GridBehavior object 150 and configured to monitor for cut, copy, and paste operations. When a cut or copy operation is performed, the object places the HTML code on the clipboard. Upon a subsequent paste operation, the HTML code is retrieved from the clipboard and inserted into the appropriate location. It is noted that, unlike some spreadsheet programs, the user is not forced to cut/copy and then immediately paste.

One unique problem that is not encountered by traditional spreadsheet programs is the ability to create a new table or free floating field through a paste operation. When a new table or free floating field is created, the architecture automatically renames the new table or free floating field and adjusts all references within the table or free floating field that was pasted.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method, at least partially implemented on a computer, comprising:
    displaying a first free floating field, a second free floating field, and text from a document written in eXtensible Markup Language (XML);
    determining a type of content already in the first free floating field;
    displaying a first user interface if the first type of content determined to already be in the first free floating field is a formula and displaying a second user interface if the first type of content determined to already be in the free floating field is text, wherein the first user interface is distinct from the second user interface, the first user interface being associated with formula entry and the second user interface being associated with text entry;
    receiving first additional content entered into the first free floating field by a user;
    interpreting the first additional content based upon the first type of content already in the first free floating field, as determined;
    automatically recalculating any formulas within the document, as needed, upon receipt of the first additional content;
    determining that a second type of content already in the second free floating field is a different type than the first type;
    displaying the other of the first user interface and the second user interface not displayed in the second-mentioned act of displaying;
    receiving second additional content entered into the second free floating field by the user;
    interpreting the second additional content based on the second type of content already in the second free floating field, as determined; and
    automatically recalculating any formulas within the document, as needed, upon receipt of the second additional content.

2. The method of claim 1, wherein displaying the first user interface comprises overlaying a formula edit box on the first free floating field to facilitate user entry of the formula into the first free floating field.

3. The method of claim 2, further comprising resizing the formula edit box as the user enters the formula.

4. The method of claim 2, further comprising extending the formula edit box horizontally and subsequently vertically as the user enters the formula.

5. The method of claim 1, further comprising displaying a table containing multiple cells within the document, wherein upon modification of a data value residing in one cell of the table a formula in the first or second free floating fields is automatically recalculated.

6. The method of claim 1, wherein a first formula is in the first free floating field, the method further comprising:
    displaying a third free floating field in the document;
    enabling the user to enter a second formula into the third free floating field, the second formula referencing the first free floating field; and upon modification of one of the first and third free floating fields, automatically recalculating the other of the first and third free floating fields.

7. The method of claim 1, further comprising:
creating a cell structure in association with the first free floating field, the cell structure holding a formula; and
creating a format structure in association with the first free floating field, the format structure holding formatting information for the first free floating field.

8. A tangible computer readable medium having computer-executable instructions that, when executed on one or more processors, perform the method as recited in claim 1.

9. An apparatus comprising:
one or more processors; and
one or more computer-readable media having computer-executable instructions therein that are configured, when executed by the one or more processors, to:
display a first free floating field, a second free floating field, and text from a document written in eXtensible Markup Language (XML);
determine a type of content already in the first free floating field;
display a first user interface if the first type of content determined to already be in the first free floating field is a formula and display a second user interface if the first type of content determined to already be in the free floating field is text, wherein the first user interface is distinct from the second user interface, the first user interface being associated with formula entry and the second user interface being associated with text entry;
receive first additional content entered into the first free floating field by a user;
interpret the first additional content based upon the first type of content already in the first free floating field, as determined;
automatically recalculate any formulas within the document, as needed, upon receipt of the first additional content;
determine that a second type of content already in the second free floating field is a different type than the first type;
display the other of the first user interface and the second user interface not displayed;
receive second additional content entered into the second free floating field by the user;
interpret the second additional content based on the second type of content already in the second free floating field, as determined; and
automatically recalculate any formulas within the document, as needed, upon receipt of the second additional content.

10. The apparatus of claim 9, wherein the instructions configured to display the first user interface are configured to overlay a formula edit box on the first free floating field to facilitate user entry of the formula into the first free floating field.

11. The apparatus of claim 10, further comprising instructions configured to resize the formula edit box as the user enters the formula.

12. The apparatus of claim 9, further comprising instructions configured to display a table containing multiple cells within the document, wherein upon modification of a data value residing in one cell of the table a formula in the first or second free floating fields is automatically recalculated.

13. The apparatus of claim 9, wherein a first formula is in the first free floating field, the apparatus further comprising instructions configured to:
display a third free floating field in the document;
enable the user to enter a second formula into the third free floating field, the second formula referencing the first free floating field; and
upon modification of one of the first and third free floating fields, automatically recalculate the other of the first and third free floating fields.

14. The apparatus of claim 9, further comprising instructions configured to:
create a cell structure in association with the first free floating field, the cell structure holding a formula; and
create a format structure in association with the first free floating field, the format structure holding formatting information for the first free floating field.

15. One or more computer-readable media having computer-executable instructions that, when executed by one or more processors, perform acts comprising:
displaying a first free floating field, a second free floating field, and text from a document written in eXtensible Markup Language (XML);
determining a type of content already in the first free floating field;
displaying a first user interface if the first type of content determined to already be in the first free floating field is a formula and displaying a second user interface if the first type of content determined to already be in the free floating field is text, wherein the first user interface is distinct from the second user interface, the first user interface being associated with formula entry and the second user interface being associated with text entry;
receiving first additional content entered into the first free floating field by a user;
interpreting the first additional content based upon the first type of content already in the first free floating field, as determined;
automatically recalculating any formulas within the document, as needed, upon receipt of the first additional content;
determining that a second type of content already in the second free floating field is a different type than the first type;
displaying the other of the first user interface and the second user interface not displayed in the second-mentioned act of displaying;
receiving second additional content entered into the second free floating field by the user;
interpreting the second additional content based on the second type of content already in the second free floating field, as determined; and
automatically recalculating any formulas within the document, as needed, upon receipt of the second additional content.

16. The media of claim 15, wherein displaying the first user interface comprises overlaying a formula edit box on the first free floating field to facilitate user entry of the formula into the first free floating field.

17. The media of claim 16, further comprising resizing the formula edit box as the user enters the formula.

18. The media of claim 15, further comprising displaying a table containing multiple cells within the document, wherein upon modification of a data value residing in one cell of the table a formula in the first or second free floating fields is automatically recalculated.

19. The media of claim 15, wherein a first formula is in the first free floating field, the media having instructions that, when executed, perform acts comprising:
- displaying a third free floating field in the document;
- enabling the user to enter a second formula into the third free floating field, the second formula referencing the first free floating field; and
- upon modification of one of the first and third free floating fields, automatically recalculating the other of the first and third free floating fields.

20. The media of claim 15 having farther instructions that, when executed, perform acts comprising:
- creating a cell structure in association with the first free floating field, the cell structure holding a formula; and
- creating a format structure in association with the first free floating field, the format structure holding formatting information for the first free floating field.

\* \* \* \* \*